US012556313B2

(12) United States Patent
Dimou et al.

(10) Patent No.: US 12,556,313 B2
(45) Date of Patent: Feb. 17, 2026

(54) DEFERRED HYBRID AUTOMATIC REPEAT REQUEST (HARQ) FEEDBACK FOR CARRIER SWITCHING

(71) Applicant: QUALCOMM Incorporated, San Diego, CA (US)

(72) Inventors: Konstantinos Dimou, New York City, NY (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 523 days.

(21) Appl. No.: 18/067,486

(22) Filed: Dec. 16, 2022

(65) Prior Publication Data

US 2023/0224087 A1 Jul. 13, 2023

Related U.S. Application Data

(60) Provisional application No. 63/298,058, filed on Jan. 10, 2022.

(51) Int. Cl.
| | |
|---|---|
| *H04W 72/11* | (2023.01) |
| *H04L 1/1812* | (2023.01) |
| *H04L 5/00* | (2006.01) |
| *H04W 74/0808* | (2024.01) |

(52) U.S. Cl.
CPC ............ *H04L 1/1812* (2013.01); *H04L 5/001* (2013.01); *H04W 74/0825* (2013.01)

(58) Field of Classification Search
CPC ... H04L 1/1812; H04L 1/1854; H04L 1/1858; H04L 1/1861; H04L 5/001; H04L 5/0053; H04L 5/0055; H04W 74/0825
See application file for complete search history.

(56) References Cited

U.S. PATENT DOCUMENTS

| | | | | |
|---|---|---|---|---|
| 2010/0272048 | A1* | 10/2010 | Pan ....................... | H04L 1/1635 370/329 |
| 2012/0182914 | A1* | 7/2012 | Hariharan ............... | H04L 1/189 370/329 |
| 2016/0330010 | A1* | 11/2016 | Qin ........................ | H04L 1/1812 |
| 2022/0109528 | A1* | 4/2022 | Babaei .................. | H04W 72/04 |
| 2023/0093477 | A1* | 3/2023 | El Hamss ............. | H04L 1/1861 |

(Continued)

OTHER PUBLICATIONS

International Search Report and Written Opinion—PCT/US2022/081933—ISA/EPO—Apr. 5, 2023.

(Continued)

*Primary Examiner* — Phuc H Tran

(74) *Attorney, Agent, or Firm* — Harrity & Harrity, LLP \ Qualcomm

(57) ABSTRACT

This disclosure provides systems, methods, and apparatuses for deferred hybrid automatic repeat request (HARQ) feedback for carrier switching. Some aspects described herein enable a user equipment (UE) to transmit, drop, refrain from transmitting, or a combination thereof, deferred HARQ feedback in various communication scenarios that involve the use of carrier switching. The UE is enabled to continue to defer deferred HARQ feedback, to drop deferred HARQ feedback, to transmit non-deferred HARQ feedback, to drop all HARQ feedback, or to process deferred HARQ feedback using another technique described herein where carrier switching is configured for the UE.

30 Claims, 18 Drawing Sheets

(56) References Cited

U.S. PATENT DOCUMENTS

2024/0008123 A1\* 1/2024 Ying ..................... H04L 5/0055
2025/0007653 A1\* 1/2025 Yang ..................... H04L 1/1854

OTHER PUBLICATIONS

NTT Docomo: "Discussion on HARQ-ACK Feedback Enhancements for Rel. 17 URLLC", 3GPP TSG RAN WG1 #107-e, R1-2112102, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 5, 2021, 12 Pages, XP052179558, p. 2, par. 2 p. 3, par. above section 2.2 p. 4, par. below, Fig. 3 p. 9, Proposal 13, Sec 2.2.2, "Agreement," box, par. 1 blw. "Agreement".

\* cited by examiner

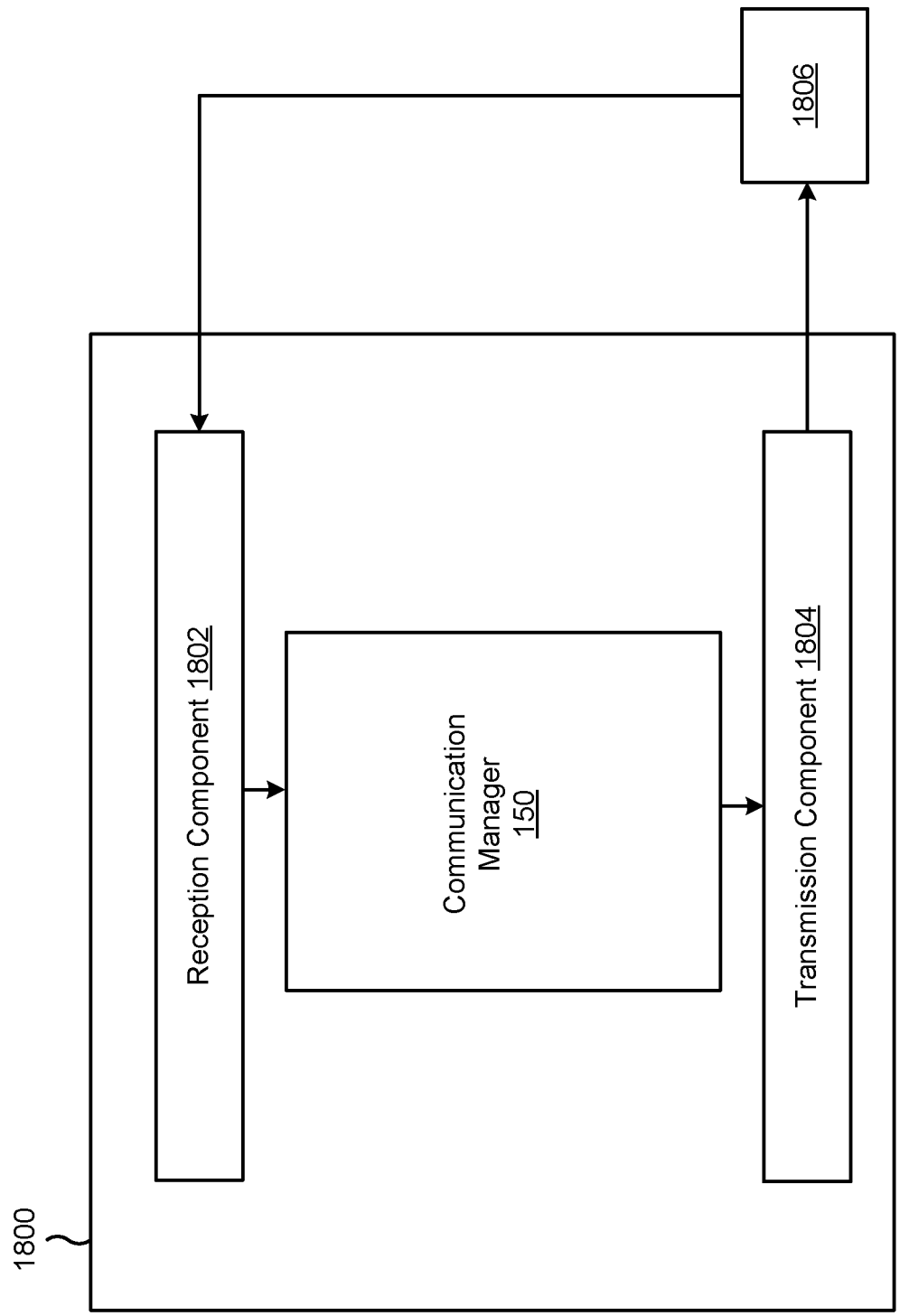

DEFERRED HYBRID AUTOMATIC REPEAT REQUEST (HARQ) FEEDBACK FOR CARRIER SWITCHING

CROSS-REFERENCE TO RELATED APPLICATION

This Patent application claims priority to U.S. Provisional Patent Application No. 63/298,058, filed on Jan. 10, 2022, entitled "DEFERRED HYBRID AUTOMATIC REPEAT REQUEST (HARQ) FEEDBACK FOR CARRIER SWITCHING," and assigned to the assignee hereof. The disclosure of the prior Application is considered part of and is incorporated by reference into this Patent Application.

TECHNICAL FIELD

Aspects of the present disclosure relate generally to wireless communication and to techniques for deferred hybrid automatic repeat request (HARQ) feedback for carrier switching.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of performed by a wireless communication apparatus. The method may include receiving a downlink communication on a first component carrier. The method may include dropping deferred hybrid automatic repeat request (HARQ) feedback, associated with the downlink communication, on a second component carrier associated with the deferred HARQ feedback exceeding an available size in an uplink resource.

In some aspects, the method can include performing, associated with a semi-static physical uplink control channel (PUCCH) cell pattern, a carrier switch from the first component carrier to the second component carrier after receiving the downlink communication and prior to the uplink resource on the second component carrier. In some aspects, the method can include transmitting, in the uplink resource, non-deferred HARQ feedback associated with another downlink communication. In some aspects, the method can include dropping at least a subset of a plurality of repetitions of the deferred HARQ feedback on the second component carrier.

Another innovative aspect of the subject matter described in this disclosure can be implemented in a wireless communication apparatus. The wireless communication apparatus may include one or more interfaces configured to obtain a downlink communication on a first component carrier. The wireless communication apparatus may include a processing system configured to drop deferred HARQ feedback, associated with the downlink communication, on a second component carrier associated with the deferred HARQ feedback exceeding an available size in an uplink resource.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a wireless communication apparatus, may cause the one or more processors to receive the downlink communication and prior to the uplink resource on the second component carrier. The one or more instructions, when executed by the one or more processors of the wireless communication apparatus, may cause the one or more processors to drop deferred HARQ feedback, associated with the downlink communication, on a second component carrier associated with the deferred HARQ feedback exceeding an available size in an uplink resource.

Another innovative aspect of the subject matter described in this disclosure can be implemented in an apparatus for wireless communication. The apparatus may include means for receiving a downlink communication on a first component carrier. The apparatus may include means for dropping deferred HARQ feedback, associated with the downlink communication, on a second component carrier associated with the deferred HARQ feedback exceeding an available size in an uplink resource.

Another innovative aspect of the subject matter described in this disclosure can be implemented in a method of performed by a wireless communication apparatus. The method may include receiving a downlink communication on a first component carrier. The method may include transmitting deferred HARQ feedback associated with the downlink communication, in a second uplink resource on a second component carrier that occurs after a first uplink resource. In some aspects, the first uplink resource occurs on the second component carrier. In some aspects, the deferred HARQ feedback is transmitted in the second uplink resource associated with the deferred HARQ feedback exceeding a threshold in the first uplink resource.

In some aspects, the method can include performing, associated with a semi-static PUCCH cell pattern, a carrier switch from the first component carrier to the second component carrier after receiving the downlink communication and prior to the second uplink resource on the second component carrier. In some aspects, the carrier switch is performed prior to the first uplink resource and the second uplink resource. In some aspects, the method can include transmitting the deferred HARQ feedback in the second uplink resource based at least in part on a quantity of bits associated with the deferred HARQ feedback exceeding a quantity of available bits in the first uplink resource associated with the deferred HARQ feedback. In some aspects, the method can include transmitting, in the uplink resource, non-deferred HARQ feedback associated with another downlink communication. In some aspects, the method can include transmitting at least a subset of a plurality of repetitions of the deferred HARQ feedback in the second uplink resource on the second component carrier.

Another innovative aspect of the subject matter described in this disclosure can be implemented in a wireless communication apparatus. The wireless communication apparatus may include one or more interfaces configured to obtain a downlink communication on a first component carrier. The method may include one or more interfaces configured to output deferred HARQ feedback associated with the downlink communication, for transmission in a second uplink resource on a second component carrier that occurs after a first uplink resource. In some aspects, the first uplink resource occurs on the second component carrier. In some aspects, the deferred HARQ feedback is transmitted in the second uplink resource associated with the deferred HARQ feedback exceeding a threshold in the first uplink resource.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a wireless communication apparatus, may cause the one or more processors to receive a downlink communication on a first component carrier. The one or more instructions, when executed by one or more processors of a wireless communication apparatus, may cause the one or more processors to transmit deferred HARQ feedback associated with the downlink communication, in a second uplink resource on a second component carrier that occurs after a first uplink resource. In some aspects, the first uplink resource occurs on the second component carrier. In some aspects, the deferred HARQ feedback is transmitted in the second uplink resource associated with the deferred HARQ feedback exceeding a threshold in the first uplink resource.

Another innovative aspect of the subject matter described in this disclosure can be implemented in an apparatus for wireless communication. The apparatus may include means for receiving a downlink communication on a first component carrier. The apparatus may include means for transmitting deferred HARQ feedback associated with the downlink communication, in a second uplink resource on a second component carrier that occurs after a first uplink resource. In some aspects, the first uplink resource occurs on the second component carrier. In some aspects, the deferred HARQ feedback is transmitted in the second uplink resource associated with the deferred HARQ feedback exceeding a threshold in the first uplink resource.

Another innovative aspect of the subject matter described in this disclosure can be implemented in a method of performed by a wireless communication apparatus. The method may include receiving a downlink communication on a first component carrier. The method May include transmitting deferred HARQ feedback, associated with the downlink communication in a second uplink resource on a second component carrier, that occurs after a first uplink resource.

In some aspects, the method can include performing, associated with a semi-static PUCCH cell pattern, a first carrier switch from the first component carrier to the second component carrier after receiving the downlink communication and prior to the first uplink resource on the second component carrier, and performing, associated with the semi-static PUCCH cell pattern, a second carrier switch from the second component carrier to the first component carrier after the first uplink resource on the second component carrier and prior to the second uplink resource on the first component carrier. In some aspects, the method can include transmitting, in a third uplink resource on the first component carrier that occurs after the second uplink resource, another subset of the plurality of repetitions of the deferred HARQ feedback. In some aspects, the method can include transmitting non-deferred HARQ feedback, associated with another downlink communication, in at least one of the first uplink resource on the second component carrier or the second uplink resource, on the first component carrier, along with the deferred HARQ feedback.

Another innovative aspect of the subject matter described in this disclosure can be implemented in a wireless communication apparatus. The wireless communication apparatus may include one or more interfaces configured to obtain a downlink communication on a first component carrier. The method may include one or more interfaces configured to output deferred HARQ feedback, associated with the downlink communication for transmission in a second uplink resource on a second component carrier, that occurs after a first uplink resource on the second component carrier, associated with the deferred HARQ feedback exceeding a threshold in the first uplink resource.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a wireless communication apparatus, may cause the one or more processors to receive a downlink communication on a first component carrier. The one or more instructions, when executed by one or more processors of a wireless communication apparatus, may cause the one or more processors to transmit deferred HARQ feedback, associated with the downlink communication in a second uplink resource on a second component carrier, that occurs after a first uplink resource on the second component carrier, associated with the deferred HARQ feedback exceeding a threshold in the first uplink resource.

Another innovative aspect of the subject matter described in this disclosure can be implemented in an apparatus for wireless communication. The apparatus may include means for receiving a downlink communication on a first component carrier. The apparatus may include means for transmitting deferred HARQ feedback, associated with the downlink communication in a second uplink resource on a second component carrier, that occurs after a first uplink resource on the second component carrier, associated with the deferred HARQ feedback exceeding a threshold in the first uplink resource.

Another innovative aspect of the subject matter described in this disclosure can be implemented in a method of performed by a wireless communication apparatus. The method may include transmitting a downlink communication on a first component carrier. The method may include receiving deferred HARQ feedback associated with the downlink communication, in a second uplink resource on a second component carrier that occurs after a first uplink resource on the second component carrier.

In some aspects, the method can include receiving non-deferred HARQ feedback, associated with another downlink communication, in the first uplink resource. In some aspects, the method can include receiving, in the second uplink resource with the first deferred HARQ feedback, second deferred HARQ feedback associated with a second downlink communication. In some aspects, the method can include receiving, in the second uplink resource with the first deferred HARQ feedback and the second deferred HARQ feedback, non-deferred HARQ feedback, associated with a third downlink communication. In some aspects, the method can include receiving at least a subset of the plurality of repetitions of the deferred HARQ feedback in the second uplink resource on the second component carrier.

Another innovative aspect of the subject matter described in this disclosure can be implemented in a wireless communication apparatus. The wireless communication apparatus may include one or more interfaces configured to output a downlink communication for transmission on a first component carrier. The wireless communication apparatus may include one or more interfaces configured to obtain deferred HARQ feedback associated with the downlink communication, in a second uplink resource on a second component carrier that occurs after a first uplink resource on the second component carrier.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a wireless communication apparatus, may cause the one or more processors to transmit a downlink communication on a first component carrier. The one or more instructions, when executed by the one or more processors of the wireless communication apparatus, may cause the one or more processors to receive deferred HARQ feedback associated with the downlink communication, in a second uplink resource on a second component carrier that occurs after a first uplink resource on the second component carrier.

Another innovative aspect of the subject matter described in this disclosure can be implemented in an apparatus for wireless communication. The apparatus may include means for transmitting a downlink communication on a first component carrier. The apparatus may include means for receiving deferred HARQ feedback associated with the downlink communication, in a second uplink resource on a second component carrier that occurs after a first uplink resource on the second component carrier.

Another innovative aspect of the subject matter described in this disclosure can be implemented in a method of performed by a wireless communication apparatus. The method may include receiving deferred HARQ feedback, associated with the downlink communication in a second uplink resource on a second component carrier, that occurs after a first uplink resource on the second component carrier.

In some aspects, the method can include receiving non-deferred HARQ feedback, associated with another downlink communication, in at least one of the first uplink resource on the second component carrier or the second uplink resource, on the first component carrier, along with the deferred HARQ feedback. In some aspects, the method can include receiving, in the second uplink resource with the first deferred HARQ feedback and the second deferred HARQ feedback, non-deferred HARQ feedback, associated with a third downlink communication. In some aspects, the method can include receiving at least a subset of a plurality of repetitions of the deferred HARQ feedback in the second uplink resource on the first component carrier.

Another innovative aspect of the subject matter described in this disclosure can be implemented in a wireless communication apparatus. The wireless communication apparatus may include one or more interfaces configured to output a downlink communication for transmission on a first component carrier. The wireless communication apparatus may include one or more interfaces configured to obtain deferred HARQ feedback, associated with the downlink communication in a second uplink resource on a second component carrier, that occurs after a first uplink resource on the second component carrier.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a wireless communication apparatus, may cause the one or more processors to transmit a downlink communication on a first component carrier. The one or more instructions, when executed by the one or more processors of the wireless communication apparatus, may cause the one or more processors to receive deferred HARQ feedback, associated with the downlink communication in a second uplink resource on a second component carrier, that occurs after a first uplink resource on the second component carrier.

Another innovative aspect of the subject matter described in this disclosure can be implemented in an apparatus for wireless communication. The apparatus may include means for transmitting a downlink communication on a first component carrier. The apparatus may include means for receiving deferred HARQ feedback, associated with the downlink communication in a first uplink resource on a second component carrier, that occurs after the first uplink resource on a second component carrier.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description. Other features, aspects, and advantages will become apparent from the description, the drawings and the claims. Note that the relative dimensions of the following figures may not be drawn to scale.

BRIEF DESCRIPTION OF THE DRAWINGS

FIGS. 14-18 are diagrams of example apparatuses for wireless communication.

Like reference numbers and designations in the various drawings indicate like elements.

DETAILED DESCRIPTION

Figure 1:
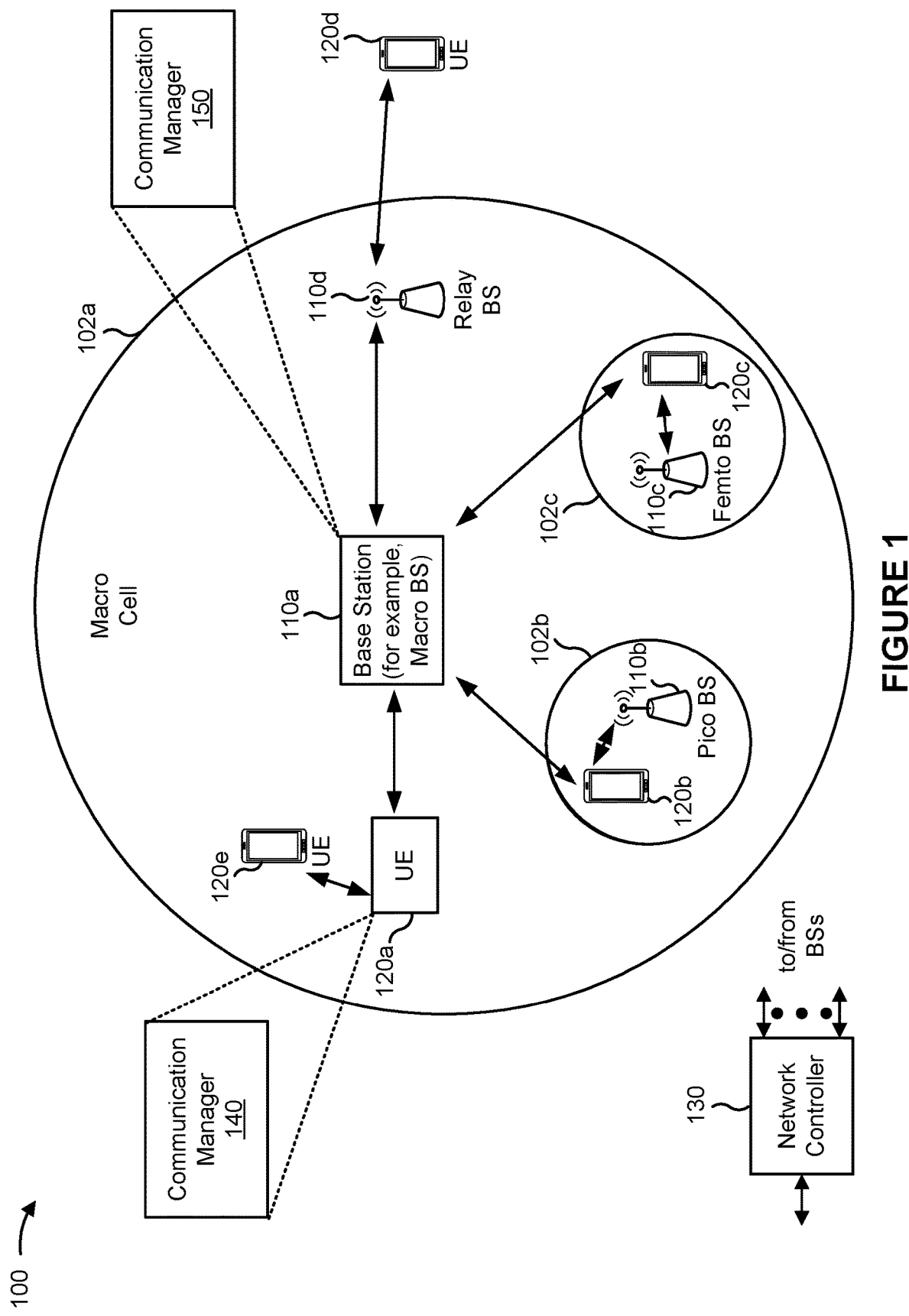
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G technology, 4G technology, 5G technology, or further implementations thereof.

In a time division duplexing (TDD) configuration, collisions may occur between downlink (DL) communications and uplink (UL) communications that are scheduled using semi-persistent scheduling (SPS) due to a slot format change. For example, a slot format change may occur for a TDD slot where the TDD slot is changed from an uplink slot format to a downlink slot format, resulting in an uplink hybrid automatic repeat request (HARQ) feedback transmission colliding (overlapping in the time domain, overlapping in the frequency domain, or both) with a downlink resource in the TDD slot. Moreover, if the HARQ feedback transmission is deferred due to the collision, semi-static carrier switching from a first component carrier to a second component carrier may result in an inability to transmit deferred HARQ feedback on the second component carrier if no HARQ feedback resource is scheduled on the second component carrier or if insufficient HARQ feedback resources are scheduled on the second component carrier.

Some aspects described herein enable a user equipment (UE) to transmit, drop, refrain from transmitting, or a combination thereof, deferred HARQ feedback in various communication scenarios that involve the use of carrier switching. As such, the UE can be enabled to continue to defer deferred HARQ feedback, to drop deferred HARQ feedback, to transmit non-deferred HARQ feedback, to drop all HARQ feedback, or to process deferred HARQ feedback using another technique described herein where carrier switching is configured for the UE.

Particular implementations of the subject matter described in this disclosure can be implemented to realize one or more of the following potential advantages. Some aspects described herein may enable a UE to process deferred HARQ feedback that is unable to be included in a target HARQ feedback resource on a component carrier where carrier switching is configured for the UE. Some aspects described herein may enable a UE to drop deferred HARQ feedback, which may decrease complexity of the UE (for example, it may decrease hardware complexity of the UE by requiring fewer memory resources to store or buffer the deferred HARQ feedback, or it may decrease the programming complexity of the UE in that logic is not needed for further deferral of deferred HARQ feedback, or both) and decrease the use of memory resources of the UE that would otherwise be used to store the deferred HARQ feedback at the UE. Some aspects described herein may enable a UE to continue to defer deferred HARQ feedback to a subsequent resource, with or without switching between component carriers), which may enable the UE to provide the deferred HARQ feedback to a network entity such as a base station. This may increase wireless communication reliability for the UE.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network entities or wireless communication apparatuses, such as one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), or other network entities. A base station 110 is an example of a network entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells.

In some examples, a cell may not necessarily be stationary, and the geographic area of the cell may move according to the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6

GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With these examples in mind, unless specifically stated otherwise, it should be understood that the term "sub-6 GHZ," if used herein, may broadly represent frequencies that may be less than 6 GHZ, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive a downlink communication on a first component carrier; and drop deferred HARQ feedback, associated with the downlink communication, on a second component carrier associated with the deferred HARQ feedback exceeding an available size in an uplink resource. Additionally, or alternatively, the communication manager 140 may perform one or more other operations described herein.

As described in more detail elsewhere herein, the communication manager 140 may receive a downlink communication on a first component carrier; and transmit deferred HARQ feedback associated with the downlink communication, in a second uplink resource on a second component carrier that occurs after a first uplink resource. In some aspects, the first uplink resource occurs on the second component carrier. In some aspects, the deferred HARQ feedback is transmitted in the second uplink resource associated with the deferred HARQ feedback exceeding a threshold in the first uplink resource. Additionally, or alternatively, the communication manager 140 may perform one or more other operations described herein.

As described in more detail elsewhere herein, the communication manager 140 may receive a downlink communication on a first component carrier; and transmit deferred HARQ feedback, associated with the downlink communication in a second uplink resource on a second component carrier, that occurs after a first uplink resource on the second component carrier, associated with the deferred HARQ feedback exceeding a threshold in the first uplink resource. Additionally, or alternatively, the communication manager 140 may perform one or more other operations described herein.

In some aspects, the base station 110 may include a communication manager 150. As described in more detail elsewhere herein, the communication manager 150 may transmit a downlink communication on a first component carrier; and receive deferred HARQ feedback associated with the downlink communication, in a second uplink resource on a second component carrier that occurs after a first uplink resource on the second component carrier. Additionally, or alternatively, the communication manager 150 may perform one or more other operations described herein.

As described in more detail elsewhere herein, the communication manager 150 may transmit a downlink communication on a first component carrier; and receive deferred HARQ feedback, associated with the downlink communication in a second uplink resource on a second component carrier, that occurs after a first uplink resource on the second component carrier. Additionally, or alternatively, the communication manager 150 may perform one or more other operations described herein.

Figure 2:
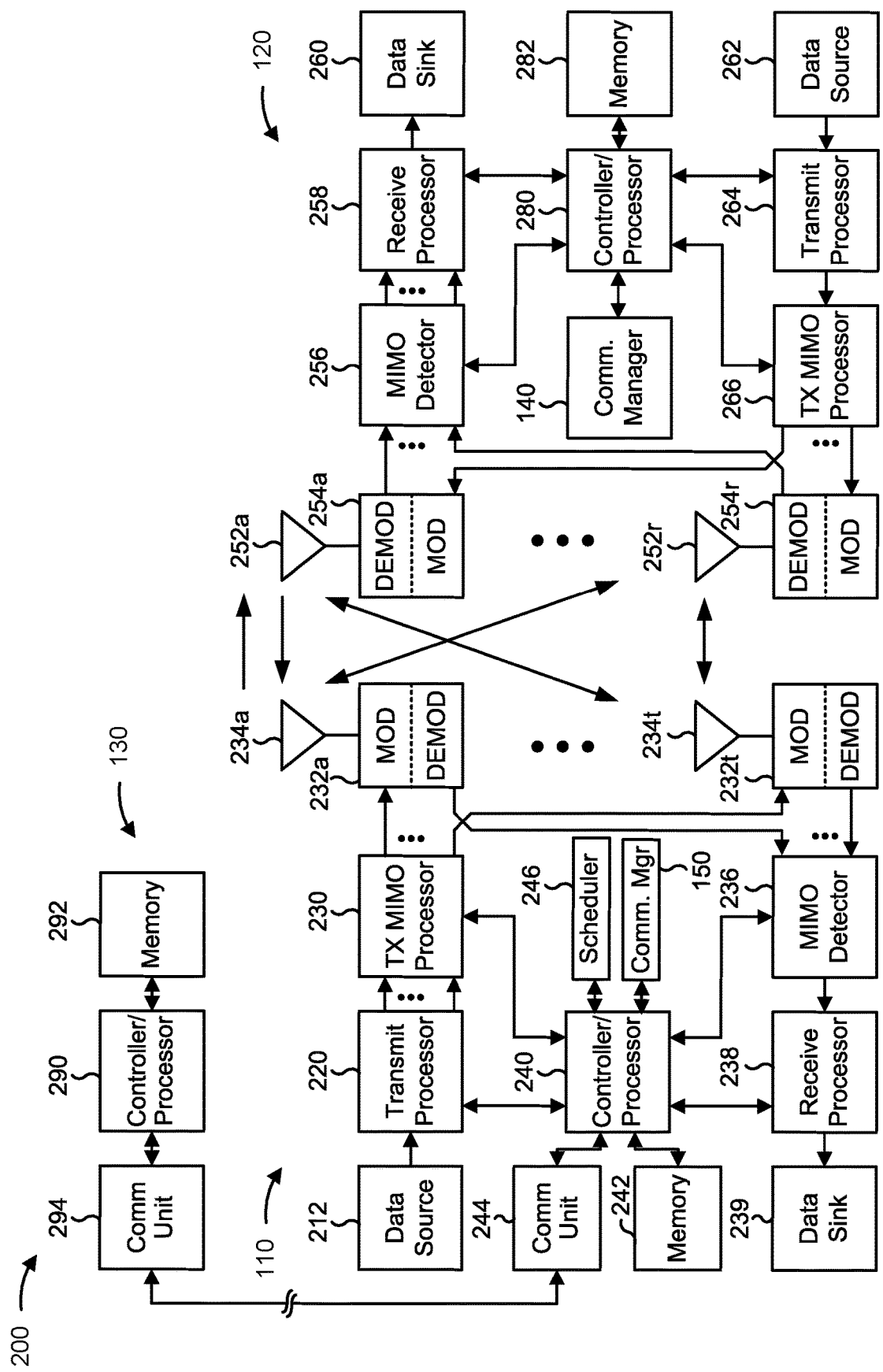
FIG. 2 is a diagram illustrating an example of a base station (BS) in communication with a user equipment (UE) in a wireless network.

FIG. 2 is a diagram illustrating an example 200 of a base station 110 in communication with a UE 120 in a wireless network 100. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The base station 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the base station 110 or other base stations 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein.

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the base station 110). For example, a processing system of the base station 110 may be a system that includes the various other components or subcomponents of the base station 110.

The processing system of the base station 110 may interface with one or more other components of the base station 110, may process information received from one or more other components (such as inputs or signals), or may output information to one or more other components. For example, a chip or modem of the base station 110 may include a processing system, a first interface to receive or obtain information, and a second interface to output, transmit, or provide information. In some examples, the first interface may be an interface between the processing system of the chip or modem and a receiver, such that the base station 110 may receive information or signal inputs, and the information may be passed to the processing system. In some examples, the second interface may be an interface between the processing system of the chip or modem and a transmitter, such that the base station 110 may transmit information output from the chip or modem. A person having ordinary skill in the art will readily recognize that the second interface also may obtain or receive information or signal inputs, and the first interface also may output, transmit, or provide information.

The controller/processor 240 of the base station 110, the controller/processor 280 of the UE 120, or any other component(s) of FIG. 2 may perform one or more techniques associated with deferred HARQ feedback for carrier switching, as described in more detail elsewhere herein. For example, the controller/processor 240 of the base station 110, the controller/processor 280 of the UE 120, or any other component(s) (or combinations of components) of FIG. 2 may perform or direct operations of, for example, process 900 of FIG. 9, process 1000 of FIG. 10, process 1100 of FIG. 11, process 1200 of FIG. 12, process 1300 of FIG. 13, or other processes as described herein. The memory 242 and the memory 282 may store data and program codes for the base station 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 900 of FIG. 9, process 1000 of FIG. 10, process 1100 of FIG. 11, process 1200 of FIG. 12, process 1300 of FIG. 13, or other processes as described herein. In some examples, executing instructions may include running the instructions, converting the instructions, compiling the instructions, or interpreting the instructions.

In some aspects, the UE 120 includes means for receiving a downlink communication on a first component carrier; or means for dropping deferred HARQ feedback, associated with the downlink communication, on a second component carrier associated with the deferred HARQ feedback exceeding an available size in an uplink resource; or a combination thereof. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving a downlink communication on a first component carrier; means for transmitting deferred HARQ feedback associated with the downlink communication, in a second uplink resource on a second component carrier that occurs after a first uplink resource; or a combination thereof. In some aspects, the first uplink resource occurs on the second component carrier. In some aspects, the UE 120 includes means for transmitting the deferred HARQ feedback in the second uplink resource associated with the deferred HARQ feedback exceeding a threshold in the first uplink resource. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving a downlink communication on a first component carrier; means for transmitting deferred HARQ feedback, associated with the downlink communication in a second uplink resource on a second component carrier, that occurs after a first uplink resource on the second component carrier, associated with the deferred HARQ feedback exceeding a threshold in the first uplink resource; or a combination thereof. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting a downlink communication on a first component carrier; means for receiving deferred HARQ feedback associated with the downlink communication, in a second uplink resource on a second component carrier that occurs after a first uplink resource on the second component carrier; or a combination thereof. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station 110 includes means for transmitting a downlink communication on a first component carrier; means for receiving deferred HARQ feedback, associated with the downlink communication in a second uplink resource on a second component carrier, that occurs after a first uplink resource on the second component carrier; or a combination thereof. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
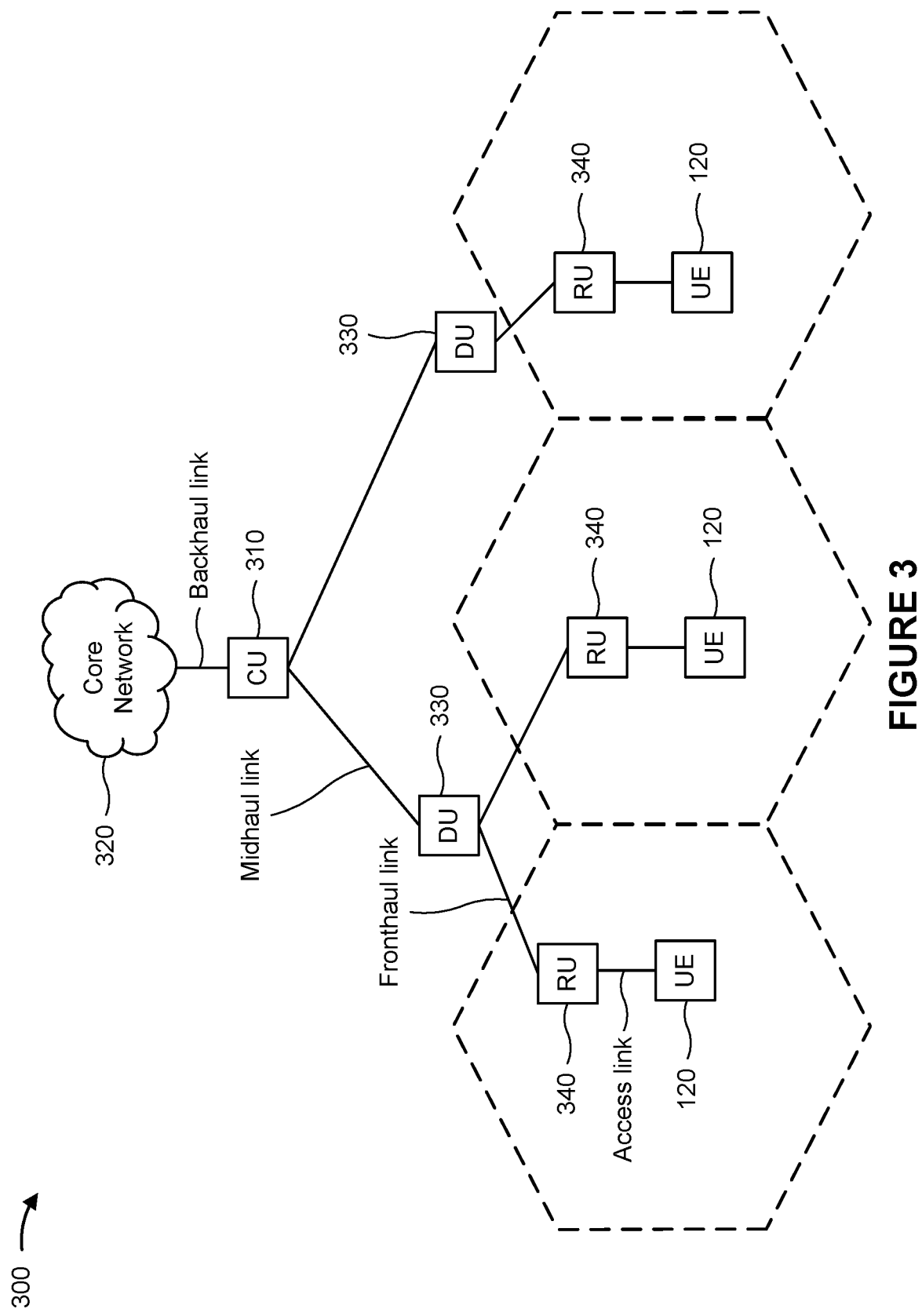
FIG. 3 is a diagram illustrating an example of an open radio access network (O-RAN) architecture.

FIG. 3 is a diagram illustrating an example 300 of an open radio access network (O-RAN) architecture. As shown in FIG. 3, the O-RAN architecture may include network entities or network nodes such as a control unit (CU) 310 that communicates with a core network 320 via a backhaul link, one or more DUs, 330, and one or more RUs 340, among other examples. The CU 310 may communicate with one or more DUs 330 via respective midhaul links. The DUs 330 may each communicate with one or more RUs 340 via respective fronthaul links, and the RUs 340 may each communicate with respective UEs 120 via radio frequency (RF) access links. The DUs 330 and the RUs 340 also may be referred to as O-RAN DUS (O-DUs) 330 and O-RAN RUS (O-RUs) 340, respectively.

In some aspects, the DUs 330 and the RUs 340 may be implemented according to a functional split architecture in which functionality of a network entity or a network node such as base station 110 (such as an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (such as forward error correction (FEC) encoding and decoding, scrambling, or modulation and demodulation) based on a lower layer functional split. Higher layer control functions, such as a packet data convergence protocol (PDCP), radio resource control (RRC), or service data adaptation protocol (SDAP), may be hosted by the CU 310. The RU(s) 340 controlled by a DU 330 may correspond to logical nodes that host RF processing functions and low-PHY layer functions (such as fast Fourier transform (FFT), inverse FFT (iFFT), digital beamforming, or physical random access channel (PRACH) extraction and filtering) based on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

Moreover, a base station 110 may be implemented as a monolithic base station or as a disaggregated base station that includes a CU 310, one or more DUs 330, one or more RUs 340, or a combination thereof. In some aspects, a CU 310, a DU 330, an RU 340, or a combination thereof may be implemented by one or more network entities, one or more network controllers 130, one or more network nodes, or a combination thereof.

Figure 4:
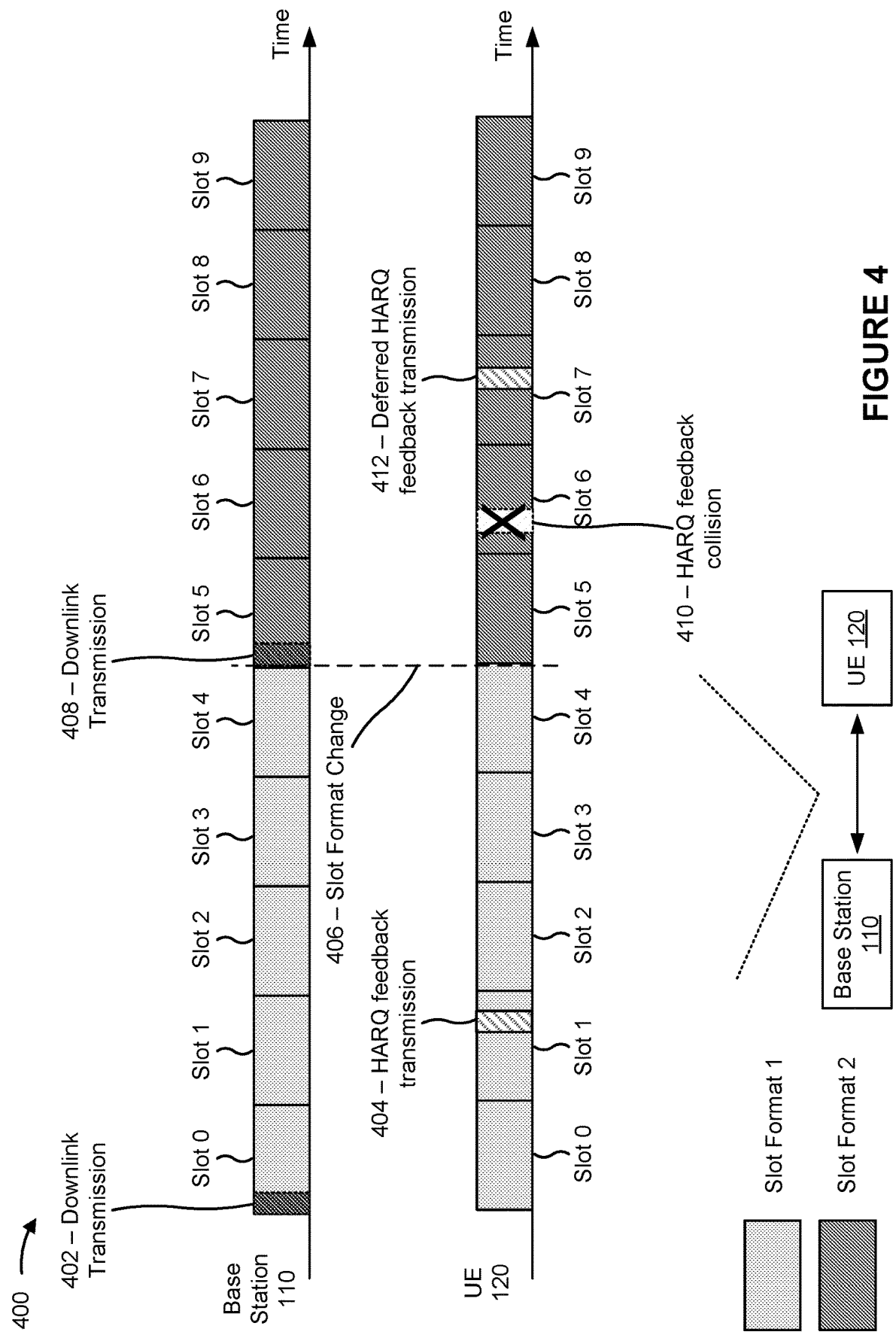
FIG. 4 is a diagram illustrating an example of deferred hybrid automatic repeat request (HARQ) feedback carrier switching.

FIG. 4 is diagram illustrating an example 400 of deferred HARQ feedback. The example 400 may include communication between a UE 120 and a base station 110 described in connection with FIGS. 1 and 2, or between a UE 120 and other types of wireless communication devices (including network entities or network notes such as a DU 330, an RU 340, or a CU 310 described in connection with FIG. 3), among other examples. As shown in FIG. 4, the base station 110 and the UE 120 may communicate in one or more slots in a wireless network such as the wireless network 100. For example, the base station 110 and the UE 120 may communicate in one or more of slots 0-9. However, the base station 110 and the UE 120 may communicate across a different quantity of slots. Moreover, the UE 120 may communicate in one or more of the slots with another network entity or network node such as a CU 310, a DU 330, an RU 340, or another network entity. Additionally or alternatively, the base station 110 may be implemented by or may include one or more of a CU 310, a DU 330, an RU 340, or another network entity described in connection with FIG. 3 or elsewhere herein.

One or more of the slots 0-9 may be configured or scheduled with a slot format, such a downlink slot format (a slot configured or scheduled for downlink transmissions), an uplink slot format (a slot configured or scheduled for uplink transmissions), or a flexible slot format (a slot that is permitted to be dynamically configured or scheduled for uplink transmissions or downlink transmissions), among other examples. In some aspects, one or more of the slots 0-9 may be configured or scheduled with a slot format in which a slot includes multiple types of symbols. For example, a slot may be configured or scheduled with a slot format that provides one or more downlink symbols in the slot, one or more uplink symbols in the slot, one or more flexible symbols in the slot, or a combination thereof.

Slot formats may be configured or scheduled in a TDD manner in which different slots have slot format types. For example slots 0-4 may be configured or scheduled with a first slot format (Slot Format 1), slots 5-9 may be scheduled with a second slot format (Slot Format 2), and so on. Moreover, the wireless network 100 may support or may be configured to enable slot format changes, where a slot format of a slot may be changed dynamically.

As shown at 402 in FIG. 4, the base station 110 (or another network entity described herein) may perform a downlink transmission in a slot (slot 0, for example) that is configured or scheduled with a downlink slot format (or a slot format that includes one or more downlink symbols). At 404, the UE 120 may be configured, instructed, or scheduled to provide HARQ feedback for the downlink transmission in a slot (slot 1, for example) that is configured or scheduled with an uplink slot format (or a slot format that includes one or more uplink symbols).

The HARQ feedback may include an acknowledgement (ACK) of the downlink transmission or a negative ACK (NACK) for the downlink transmission. An ACK may indicate that the downlink transmission was successfully received and decoded by the UE 120. A NACK may indicate that reception, decoding, or a combination thereof for the downlink transmission was not successful by the UE 120. In some aspects, the base station 110 may perform a retransmission of all or a portion of the downlink transmission based on receiving a NACK from the UE 120. In this way, the UE 120 may receive the retransmission and reattempt decoding of the downlink transmission, which may increase reliability of wireless communication in the wireless network 100.

At 406, a slot format change may occur, where the base station 110 and the UE 120 switch from the first slot format (Slot Format 1) to the second slot format (Slot Format 2). The slot format change may be indicated by the base station 110 to the UE 120 (for example, dynamically or semi-statically). At 408, the base station 110 may transmit another downlink transmission to the UE 120. For example, the base station base station 110 may transmit another downlink transmission to the UE 120 in Slot 5 after the slot format change.

As shown at 410 in FIG. 4, in some cases, a collision may occur between transmission of the HARQ feedback and a downlink resource. In other words, the HARQ feedback may be scheduled to be transmitted in a slot or symbol that is configured or scheduled with a downlink slot format. This may occur, for example, where HARQ feedback is configured or scheduled to be transmitted semi-statically and because of the slot format change. For example, the UE 102 may be semi-statically scheduled or configured to transmit the HARQ feedback in a symbol in Slot 6 that was changed from an uplink symbol in the first slot format (Slot Format 1) to a downlink symbol in the second slot format (Slot Format 2). As a result, the collision occurs because the symbol in Slot 6 is no longer available for uplink transmission of the HARQ feedback (the HARQ feedback transmission collides with the downlink symbol in Slot 6).

As shown at 412 in FIG. 4, in some cases, the UE 120 may defer transmission of the HARQ feedback to a subsequent slot in which a physical uplink control channel (PUCCH) resource is available in cases where a collision between the HARQ feedback and a downlink resource e (for example, a downlink symbol). In some cases, the UE 120 may defer transmission of the HARQ feedback to the first available PUCCH resource. For example, the UE 120 may identify the first available PUCCH resource in the next slot (Slot 7) for transmission of the HARQ feedback). In some cases, the UE 120 may defer transmission of the HARQ feedback to another available PUCCH resource. In this way, the UE 120 is still enabled to transmit the HARQ feedback to the base station 110, which may increase reliability in the wireless network 100.

Figure 5:
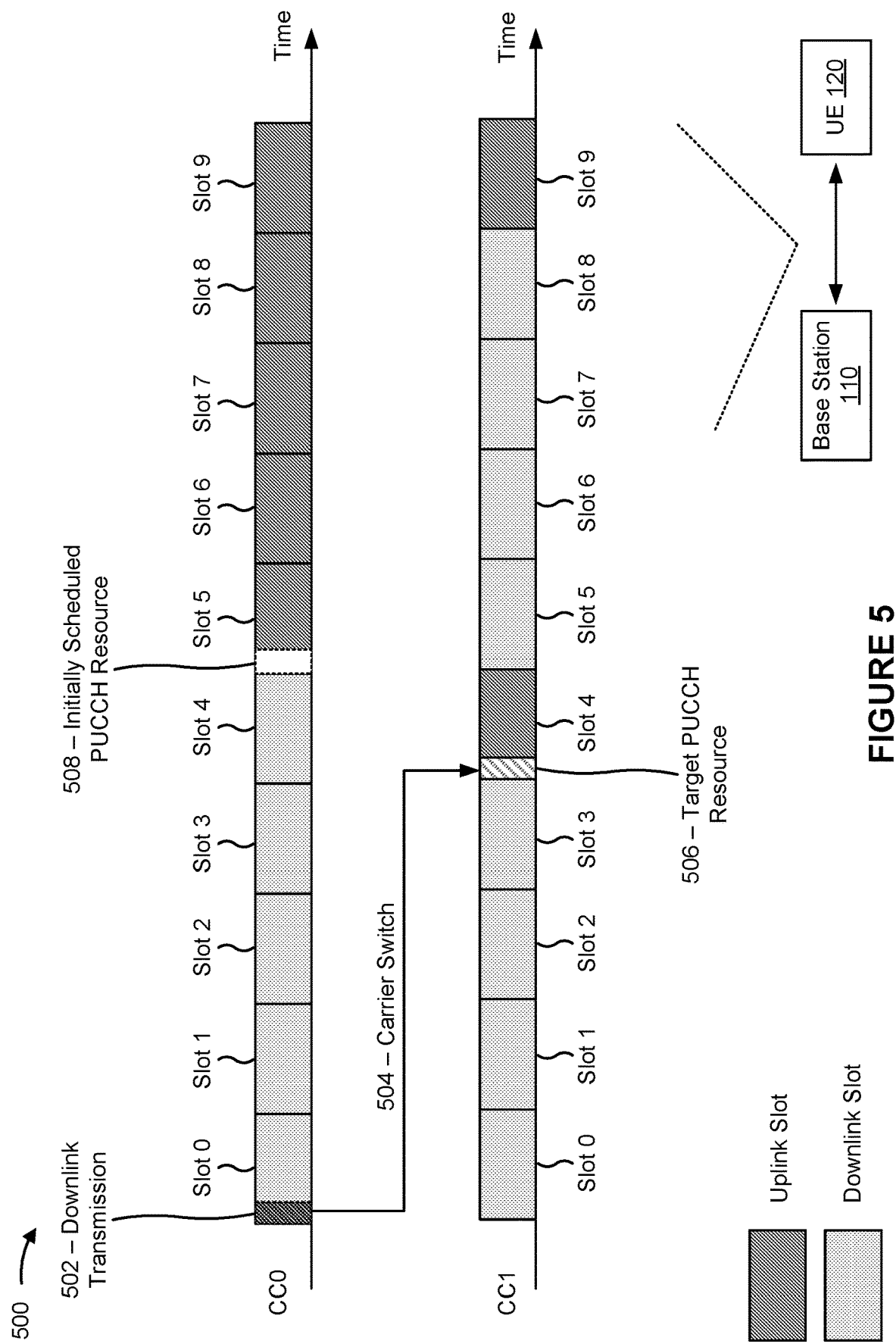
FIG. 5 is a diagram illustrating an example of carrier switching.

FIG. 5 is diagram illustrating an example 500 of carrier switching. The example 500 may include communication between a UE 120 and a base station 110 described in connection with FIGS. 1 and 2, or between a UE 120 and other types of wireless communication devices (including network entities or network notes such as a DU 330, an RU 340, or a CU 310 described in connection with FIG. 3), among other examples. As shown in FIG. 5, the base station 110 and the UE 120 may communicate in one or more slots in a wireless network such as the wireless network 100. For example, the base station 110 and the UE 120 may communicate in one or more of slots 0-9. However, the base station 110 and the UE 120 may communicate across a different quantity of slots. Moreover, the UE 120 may communicate in one or more of the slots with another network entity or network node such as a CU 310, a DU 330, an RU 340, or another network entity. Additionally or alternatively, the base station 110 may be implemented by or may include one or more of a CU 310, a DU 330, an RU 340, or another network entity described in connection with FIG. 3 or elsewhere herein.

As further shown in FIG. 5, the UE 120 and the base station 110 may communicate on a plurality of component carriers such as CC0 and CC1. However, the UE 120 and the base station 110 may communicate on a different quantity of component carriers. A component carrier may include a subset of a frequency range of a bandwidth part (BWP) allocated for communication between the UE 120 and the base station 110. In some cases, the plurality of component carriers may be included in the same BWP or in different BWPs.

As further shown in FIG. 5, carrier switching between the component carriers may be supported and enabled for the UE 120. Carrier switching may include PUCCH carrier switching, where PUCCH resources may be scheduled on both component carriers, which results in the UE 120 switching between CC0 and CC1 to use the PUCCH resources on different component carriers. Carrier switching may be dynamically indicated by the base station 110 in downlink control information (DCI), may be semi-statically configured for the UE 120 in a radio resource control (RRC) configuration or in a medium access control channel (MAC) control element (MAC-CE), or a combination thereof. In some cases, semi-static PUCCH carrier switching may be based on an RRC-configured semi-static time domain PUCCH cell pattern of applicable PUCCH cells (or component carriers), and may support switching across PUCCH cells (or component carriers) with different numerologies.

A semi-static time domain PUCCH cell pattern may include a pattern (that is semi-static) of PUCCH resources on two or more component carriers that result in a UE 120 switching between the two or more component carriers to use the PUCCH resources. As an example, a semi-static time domain PUCCH cell pattern may include PUCCH resources in a first slot on a first component carrier, may include PUCCH resources in a second slot (subsequent to the first slot) on a second component carrier, may include PUCCH resources in a third slot (subsequent to the second slot) on the first component carrier, and so on. Thus, a UE 120 configured with the example semi-static time domain PUCCH cell pattern may use the PUCCH resources in the first slot on the first component carrier, may perform a carrier switch to switch from the first component carrier to the second component carrier to use the PUCCH resources in the second slot, may perform a carrier switch to switch from the second component carrier to the first component carrier to use the PUCCH resources in the third slot, and so on.

As an example of the above, at 502, the base station 110 may transmit a downlink transmission to the UE 120. The UE 120 may receive the downlink transmission on the CC0. At 504, the UE 120 may perform a carrier switch after receiving the downlink transmission on the CC0. The carrier switch may include switching from the CC0 to the CC1. The carrier switch may include tuning or adjusting the modem 254, the antennas 252, other hardware of the UE 120, or a combination thereof to operate on the frequency range of the CC1. At 506, the UE 120 may transmit a PUCCH resource in a target PUCCH resource in Slot 4 on the CC1 instead of an initially scheduled PUCCH resource in Slot 5 on CC0 at 508 based on the carrier switch.

Figure 6:
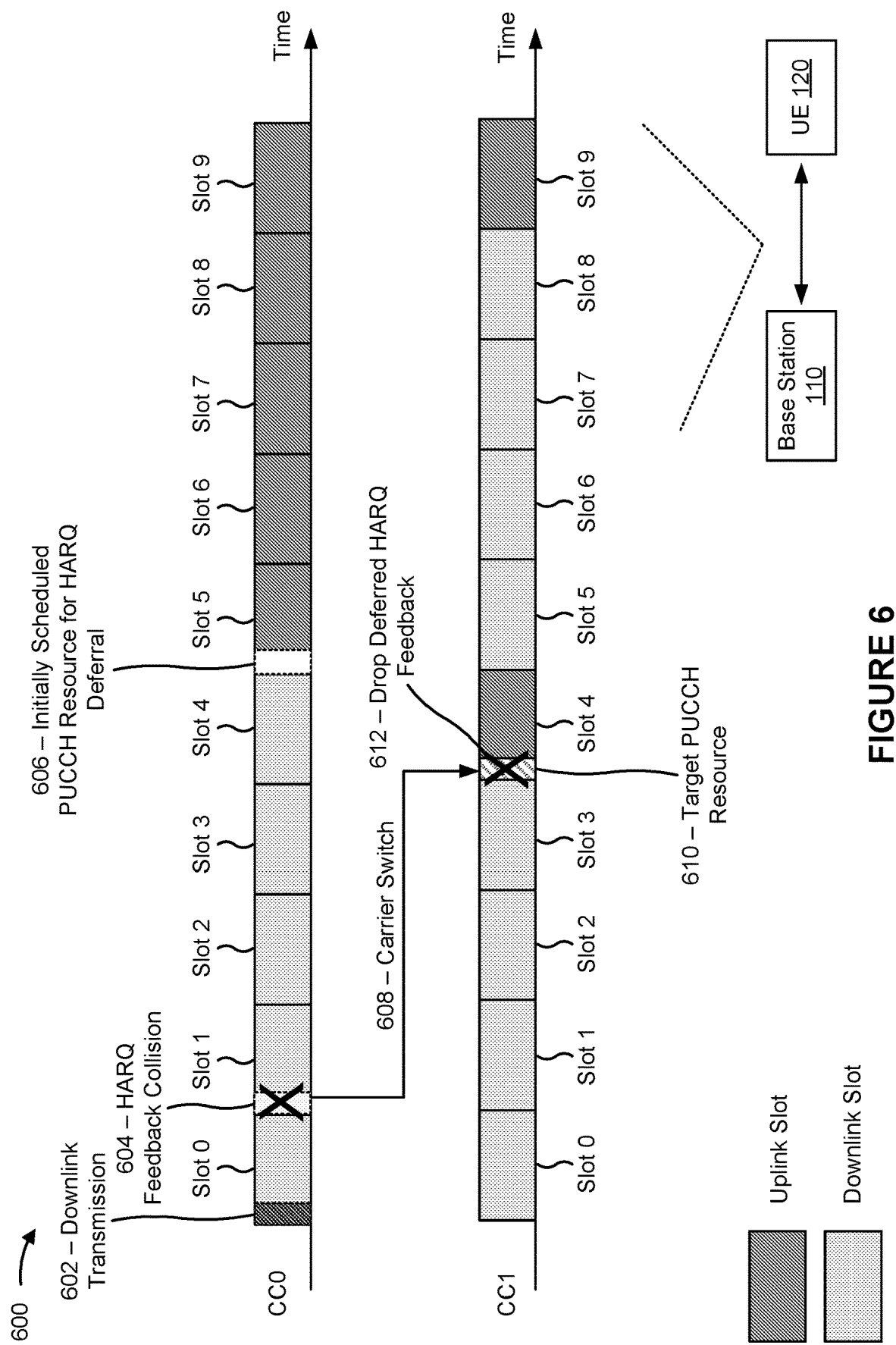
FIGS. 6-8 are diagrams illustrating examples associated with deferred hybrid automatic repeat request (HARQ) feedback for carrier switching.

FIG. 6 is a diagram illustrating an example 600 of deferred HARQ feedback for carrier switching. The example 600 may include communication between a UE 120 and a base station 110 described in connection with FIGS. 1 and 2, or between a UE 120 and other types of wireless communication devices (including network entities or network notes such as a DU 330, an RU 340, or a CU 310 described in connection with FIG. 3), among other examples. As shown in FIG. 6, the base station 110 and the UE 120 may communicate in one or more slots in a wireless network such as the wireless network 100. For example, the base station 110 and the UE 120 may communicate in one or more of slots 0-9. However, the base station 110 and the UE 120 may communicate across a different quantity of slots. Moreover, the UE 120 may communicate in one or more of the slots with another network entity or network node such as a CU 310, a DU 330, an RU 340, or another network entity. Additionally or alternatively, the base station 110 may be implemented by or may include one or more of a CU 310, a DU 330, an RU 340, or another network entity described in connection with FIG. 3 or elsewhere herein. Moreover, the UE 120 and the base station 110 may communicate on a plurality of component carriers, including CC0 and CC1.

In the example 600, HARQ feedback deferral and carrier switching may be configured and enabled for the UE 120

(simultaneous configuration of SPS HARQ deferral and PUCCH cell switching based on a semi-static time domain pattern). For target slot determination for transmitting deferred HARQ feedback, the UE 120 may first determine a next PUCCH slot using the semi-static time domain PUCCH cell pattern and related parameters for semi-static PUCCH cell switching. The UE 120 may then determine if the next PUCCH slot is the target PUCCH slot for the deferred HARQ feedback based on SPS HARQ deferral parameters for the UE 120. If the next PUCCH slot is the target PUCCH slot, the UE 120 may determine whether to transmit the deferred HARQ feedback in the target PUCCH slot. However, in some cases, the deferred HARQ feedback may not fit in the PUCCH resource in the target PUCCH slot (for example, because non-deferred HARQ feedback is also scheduled to be transmitted in the PUCCH resource). In the example 600, the UE 120 is configured to drop the deferred HARQ feedback where the deferred HARQ feedback is too large to be transmitted in the PUCCH resource in the target PUCCH slot where carrier switching is configured for the UE 120.

At 602, the base station 110 may transmit a downlink transmission to the UE 120. The UE 120 may receive the downlink transmission on the CC0. Subsequently, a slot format change may occur on the CC0. For example, the slot format of slot 1 may be changed (the base station 110 may reconfigure the slot 1) from an uplink slot format or from a slot format that includes uplink symbols to a downlink slot format or to a slot format that does not include uplink symbols. As a result, at 604, a collision may occur in the slot 1 between transmission of the HARQ feedback and one or more downlink symbols in the slot 1. The UE 120 may determine to defer transmission of the HARQ feedback to a subsequent slot based on the collision. For example, at 606, the UE 120 may select an initially scheduled PUCCH resource for HARQ deferral on the CC0 for transmission of deferred HARQ feedback for the downlink transmission. The initially scheduled PUCCH resource may include an uplink resource that includes time domain resources, frequency domain resources, or a combination thereof.

At 608, the UE 120 may perform a carrier switch after receiving the downlink transmission on the CC0 and after the collision. The carrier switch may include switching from the CC0 to the CC1. The carrier switch may include tuning or adjusting the modem 254, the antennas 252, other hardware of the UE 120, or a combination thereof to operate on the frequency range of the CC1. The UE 120 may perform the carrier switch based on a semi-static PUCCH cell pattern, based on another configuration, or based on signaling from the base station 110.

At 610, the UE 120 may select or identify a target PUCCH resource for transmission of the deferred HARQ feedback on CC1 (for example, in Slot 4 on the CC1) instead of an initially scheduled PUCCH resource in Slot 5 on the CC0 at 508 based on the carrier switch. CC1 thus becomes the target component carrier for the deferred HARQ feedback based on the carrier switch from the CC0 to the CC1. The target PUCCH resource may include an uplink resource that includes time domain resources, frequency domain resources, or a combination thereof.

At 612, the UE 120 may drop the deferred HARQ feedback on the CC1 based on the deferred HARQ feedback exceeding an available size in the target PUCCH resource, or based on the HARQ feedback exceeding a threshold in the target PUCCH resource. In other words, the UE 120 does not further defer the deferred HARQ feedback to another PUCCH resource after the target PUCCH resource, and instead drops or refrains from transmitting the deferred HARQ feedback altogether. This reduces complexity for the UE 120 to process non-deferred HARQ feedback in the target PUCCH resource. In some aspects, if non-deferred HARQ feedback for another downlink communication is also scheduled or configured to be transmitted in the target PUCCH resource, the UE 120 also may drop or refrain from transmitting the non-deferred HARQ feedback so that no HARQ feedback is transmitted in the target PUCCH resource. Alternatively, the UE 120 may transmit the non-deferred HARQ feedback in the target PUCCH resource.

In some aspects, the UE 120 is configured at the time of deployment with a configuration that indicates the UE 120 is to drop deferred HARQ feedback where the deferred HARQ feedback exceeds the available size of a target PUCCH resource. In some aspects, the base station 110 transmits (and the UE 120 receives) a configuration in an RRC communication, a DCI communication, a MAC-CE communication, or another type of downlink communication, and the UE 120 drops deferred HARQ feedback based on the configuration.

The UE 120 may determine that the HARQ feedback exceeds the threshold or the available size in the target PUCCH resource, and may determine to drop the deferred HARQ feedback based on determining that the HARQ feedback exceeds the threshold or the available size in the target PUCCH resource. In particular, the UE 120 may determine that a quantity of bits for the deferred HARQ feedback exceeds a quantity of available bits in the target PUCCH resource.

In some aspects, the UE 120 is scheduled or configured to transmit a plurality of repetitions of the HARQ feedback for the downlink transmission. The UE 120 may defer a subset of the repetitions (which become repetitions of deferred HARQ feedback) and transmit another subset of the repetitions based on the collision, or may defer all repetitions of the HARQ feedback. The techniques described in connection with example 600 may be extended to processing repetitions of deferred HARQ feedback. For example, the UE 120 may drop or refrain from transmitting at least a subset of repetitions of deferred HARQ feedback based on the subset of repetitions of deferred HARQ feedback exceeding the available size (or threshold) in the target PUCCH resource. This reduces complexity for the UE 120 to process non-deferred HARQ feedback in the target PUCCH resource, and also may reduce latency and resource consumption, as some repetitions of the HARQ feedback may already be successfully received by the base station 110.

Additionally or alternatively, the UE 120 may drop or refrain from transmitting at least a subset of repetitions of deferred HARQ feedback based on a quantity of the repetitions of the deferred HARQ feedback that collided with at least one downlink communication on the CC0 satisfying a threshold. For example, the UE 120 may drop at least a subset of repetitions of deferred HARQ feedback based on 10 of 15 repetitions colliding with at least one downlink communication on the CC0. As another example, the UE 120 may drop at least a subset of repetitions of deferred HARQ feedback based on at least 50% or more of repetitions colliding with at least one downlink communication on the CC0.

In aspects where repetitions of deferred HARQ feedback are dropped in the target PUCCH resource, if non-deferred HARQ feedback for another downlink communication is also scheduled or configured to be transmitted in the target PUCCH resource, the UE 120 also may drop or refrain from transmitting the non-deferred HARQ feedback so that no HARQ feedback is transmitted in the target PUCCH resource. Alternatively, the UE 120 may transmit the non-deferred HARQ feedback in the target PUCCH resource.

Figure 7:
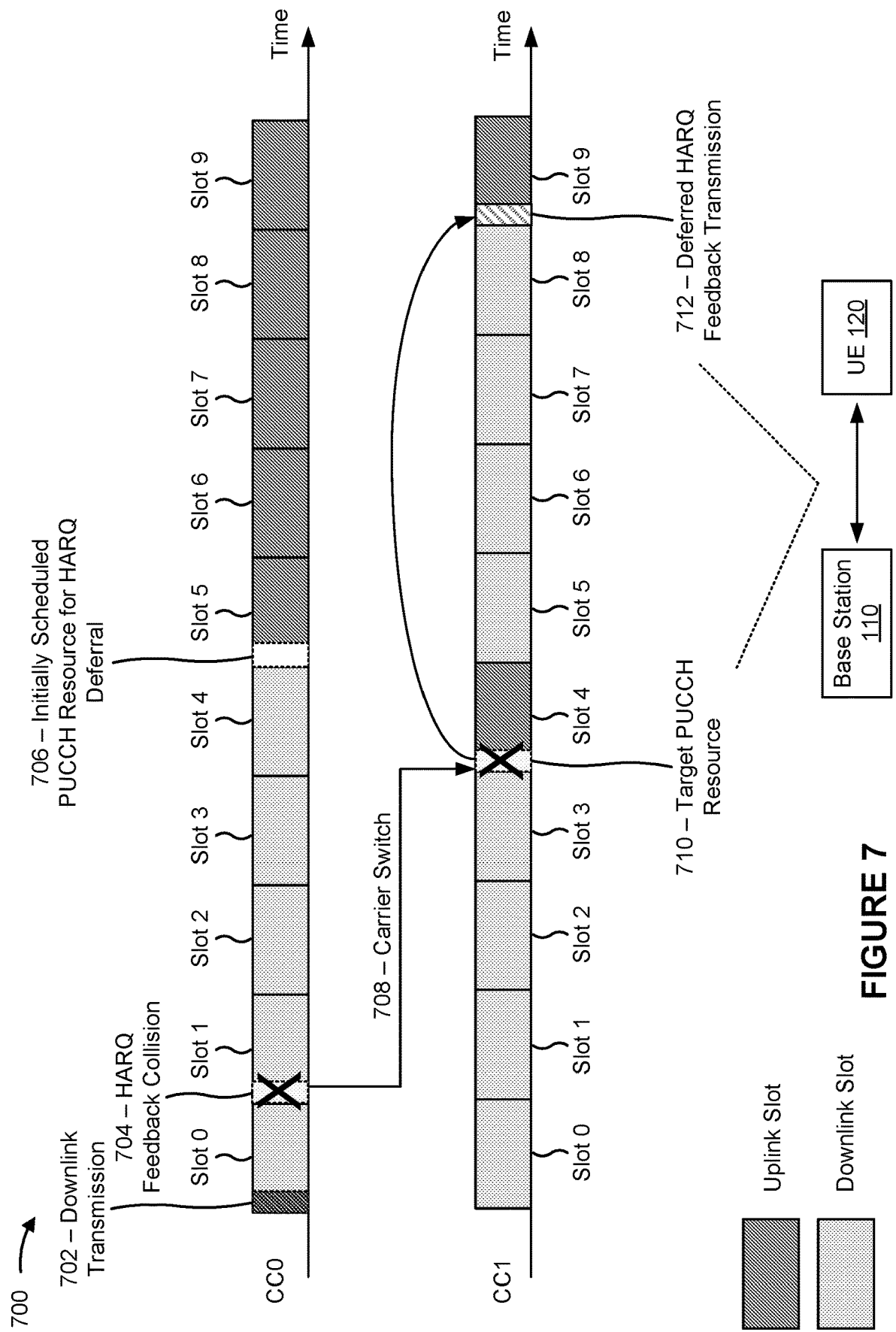

FIG. 7 is a diagram illustrating an example 700 of deferred HARQ feedback for carrier switching. The example 700 may include communication between a UE 120 and a base station 110 described in connection with FIGS. 1 and 2, or between a UE 120 and other types of wireless communication devices (including network entities or network notes such as a DU 330, an RU 340, or a CU 310 described in connection with FIG. 3), among other examples. As shown in FIG. 7, the base station 110 and the UE 120 may communicate in one or more slots in a wireless network such as the wireless network 100. For example, the base station 110 and the UE 120 may communicate in one or more of slots 0-9. However, the base station 110 and the UE 120 may communicate across a different quantity of slots. Moreover, the UE 120 may communicate in one or more of the slots with another network entity or network node such as a CU 310, a DU 330, an RU 340, or another network entity. Additionally or alternatively, the base station 110 may be implemented by or may include one or more of a CU 310, a DU 330, an RU 340, or another network entity described in connection with FIG. 3 or elsewhere herein. Moreover, the UE 120 and the base station 110 may communicate on a plurality of component carriers, including CC0 and CC1.

In the example 700, HARQ feedback deferral and carrier switching may be configured and enabled for the UE 120 (simultaneous configuration of SPS HARQ deferral and PUCCH cell switching based on a semi-static time domain pattern). For target slot determination for transmitting deferred HARQ feedback, the UE 120 may first determine a next PUCCH slot using the semi-static time domain PUCCH cell pattern and related parameters for semi-static PUCCH cell switching. The UE 120 may then determine if the next PUCCH slot is the target PUCCH slot for the deferred HARQ feedback based on SPS HARQ deferral parameters for the UE 120. If the next PUCCH slot is the target PUCCH slot, the UE 120 may determine whether to transmit the deferred HARQ feedback in the target PUCCH slot. However, in some cases, the deferred HARQ feedback may not fit in the PUCCH resource in the target PUCCH slot (for example, because non-deferred HARQ feedback is also scheduled to be transmitted in the PUCCH resource). In the example 700, the UE 120 is configured to continue to defer the deferred HARQ feedback where the deferred HARQ feedback is too large to be transmitted in the PUCCH resource in the target PUCCH slot where carrier switching is configured for the UE 120. In particular, in the example 700, the UE 120 stays on the target component carrier (in other words, the UE 120 ignores the semi-static time domain PUCCH cell pattern) until the UE 120 transmits the deferred HARQ feedback on the target component carrier. Then, the UE 120 may resume adherence to the semi-static time domain PUCCH cell pattern.

At 702, the base station 110 may transmit a downlink transmission to the UE 120. The UE 120 may receive the downlink transmission on the CC0. Subsequently, a slot format change may occur on the CC0. For example, the slot format of slot 1 may be changed (the base station 110 may reconfigure the slot 1) from an uplink slot format or from a slot format that includes uplink symbols to a downlink slot format or to a slot format that does not include uplink symbols. As a result, at 704, a collision may occur in the slot 1 between transmission of the HARQ feedback and one or more downlink symbols in the slot 1. The UE 120 may determine to defer transmission of the HARQ feedback to a subsequent slot based on the collision. For example, at 706, the UE 120 may identify or select an initially scheduled PUCCH resource for HARQ deferral on the CC0 for transmission of deferred HARQ feedback for the downlink transmission. The initially scheduled PUCCH resource may include an uplink resource that includes time domain resources, frequency domain resources, or a combination thereof.

At 708, the UE 120 may perform a carrier switch after receiving the downlink transmission on the CC0 and after the collision. The carrier switch may include switching from the CC0 to the CC1. The carrier switch may include tuning or adjusting the modem 254, the antennas 252, other hardware of the UE 120, or a combination thereof to operate on the frequency range of the CC1. The UE 120 may perform the carrier switch based on a semi-static PUCCH cell pattern, based on another configuration, or based on signaling from the base station 110.

At 710, the UE 120 may determine or identify a target PUCCH resource for transmission of the deferred HARQ feedback on CC1 (for example, in Slot 4 on the CC1) instead of an initially scheduled PUCCH resource in Slot 5 on the CC0 at 508 based on the carrier switch. CC1 thus becomes the target component carrier for the deferred HARQ feedback based on the carrier switch from the CC0 to the CC1. The target PUCCH resource may include an uplink resource that includes time domain resources, frequency domain resources, or a combination thereof.

At 712, the UE 120 may continue to defer transmission of the deferred HARQ feedback to a subsequent PUCCH resource on the CC1 based on the deferred HARQ feedback exceeding the threshold in the target PUCCH resource. In other words, the UE 120 stays on the CC1 (does not switch back to the CC0) until the UE 120 identifies or selects a subsequent PUCCH for the deferred HARQ feedback on the CC1 and transmits (and the base station 110 receives) the deferred HARQ feedback in the subsequent PUCCH resource on the CC1. The UE 120 may stay on the CC1 to transmit the deferred HARQ feedback on the CC1 even if new HARQ bits for subsequent downlink transmissions are to be transmitted. The UE 120 may then resume carrier switching based on the semi-static time domain PUCCH cell pattern.

The UE 120 may determine that the HARQ feedback exceeds the threshold or the available size in the target PUCCH resource, and may determine to transmit the deferred HARQ feedback in the subsequent PUCCH resource based on determining that the HARQ feedback exceeds the threshold or the available size in the target PUCCH resource. In particular, the UE 120 may determine that a quantity of bits for the deferred HARQ feedback exceeds a quantity of available bits in the target PUCCH resource.

In some aspects, the UE 120 is configured at the time of deployment with a configuration that indicates the UE 120 is to transmit deferred HARQ feedback in a subsequent PUCCH resource, and to ignore the semi-static time domain PUCCH cell pattern, where the deferred HARQ feedback exceeds the available size of a target PUCCH resource. In some aspects, the base station 110 transmits (and the UE 120 receives) a configuration in an RRC communication, a DCI communication, a MAC-CE communication, or another type of downlink communication, and the UE 120 transmits (and the base station 110 receives) the deferred HARQ feedback in the subsequent PUCCH resource based on the configuration.

In some aspects, if non-deferred HARQ feedback for another downlink communication is also scheduled or configured to be transmitted in the target PUCCH resource, the UE 120 also may drop or refrain from transmitting the non-deferred HARQ feedback so that no HARQ feedback is transmitted in the target PUCCH resource. Alternatively, the UE 120 may transmit (and the base station 110 may receive) the non-deferred HARQ feedback in the target PUCCH resource. If non-deferred HARQ feedback that is scheduled to be transmitted in the target PUCCH resource also becomes deferred, the UE 120 may transmit (and the base station 110 may receive) this other deferred HARQ feedback in the subsequent PUCCH resource along with the deferred HARQ feedback. Moreover, the UE 120 may transmit (and the base station 110 may receive) other non-deferred HARQ feedback for another downlink communication in the subsequent PUCCH resource along with the deferred HARQ feedback, the other deferred HARQ feedback, or a combination thereof.

In some aspects, the UE 120 is scheduled or configured to transmit a plurality of repetitions of the HARQ feedback for the downlink transmission. The UE 120 may defer a subset of the repetitions (which become repetitions of deferred HARQ feedback) based on the collision, or may defer all repetitions of the HARQ feedback. The techniques described in connection with example 700 may be extended to processing repetitions of deferred HARQ feedback. For example, the UE 120 may transmit (and the base station 110 may receive) at least a subset of repetitions of deferred HARQ feedback in the subsequent PUCCH resource on the CC1 based on the subset of repetitions of deferred HARQ feedback exceeding the available size (or threshold) in the target PUCCH resource. In aspects where repetitions of deferred HARQ feedback are deferred from the target PUCCH resource to the subsequent PUCCH resource on the CC1, the UE 120 may transmit (and the base station 110 may receive) repetitions of non-deferred HARQ feedback in a target PUCCH resource, repetitions of non-deferred HARQ feedback in a subsequent PUCCH resource, repetitions of other deferred HARQ feedback in the subsequent PUCCH resource, or a combination thereof along with the subset of repetitions of the deferred HARQ feedback.

Figure 8:
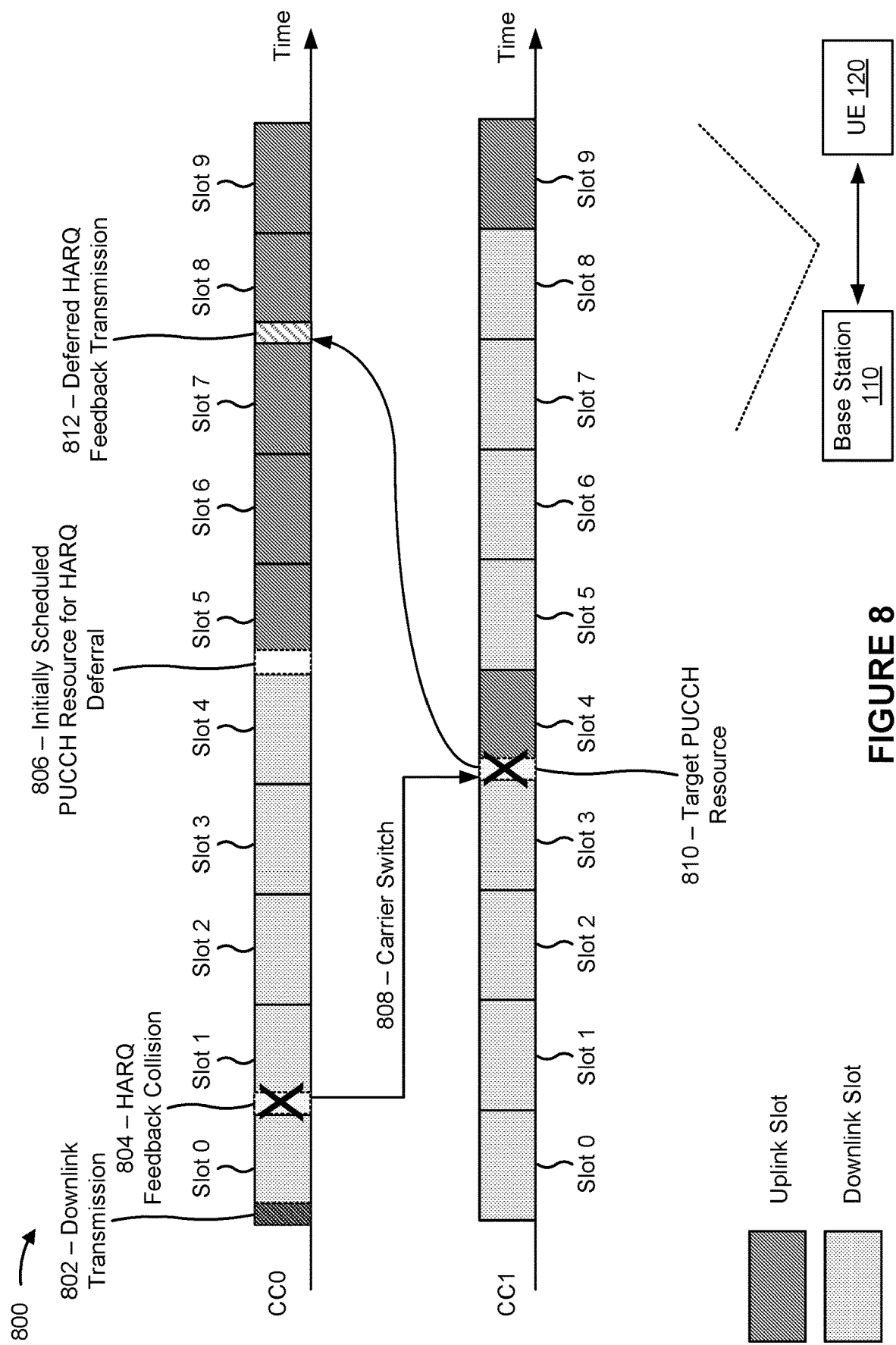

FIG. 8 is a diagram illustrating an example 800 of deferred HARQ feedback for carrier switching. The example 800 may include communication between a UE 120 and a base station 110 described in connection with FIGS. 1 and 2, or between a UE 120 and other types of wireless communication devices (including network entities or network notes such as a DU 330, an RU 340, or a CU 310 described in connection with FIG. 3), among other examples. As shown in FIG. 8, the base station 110 and the UE 120 may communicate in one or more slots in a wireless network such as the wireless network 100. For example, the base station 110 and the UE 120 may communicate in one or more of slots 0-9. However, the base station 110 and the UE 120 may communicate across a different quantity of slots. Moreover, the UE 120 may communicate in one or more of the slots with another network entity or network node such as a CU 310, a DU 330, an RU 340, or another network entity. Additionally or alternatively, the base station 110 may be implemented by or may include one or more of a CU 310, a DU 330, an RU 340, or another network entity described in connection with FIG. 3 or elsewhere herein.

Moreover, the UE 120 and the base station 110 may communicate on a plurality of component carriers, including CC0 and CC1.

In the example 800, HARQ feedback deferral and carrier switching may be configured and enabled for the UE 120 (simultaneous configuration of SPS HARQ deferral and PUCCH cell switching based on a semi-static time domain pattern). For target slot determination for transmitting deferred HARQ feedback, the UE 120 may first determine a next PUCCH slot using the semi-static time domain PUCCH cell pattern and related parameters for semi-static PUCCH cell switching. The UE 120 may then determine if the next PUCCH slot is the target PUCCH slot for the deferred HARQ feedback based on SPS HARQ deferral parameters for the UE 120. If the next PUCCH slot is the target PUCCH slot, the UE 120 may determine whether to transmit the deferred HARQ feedback in the target PUCCH slot. However, in some cases, the deferred HARQ feedback may not fit in the PUCCH resource in the target PUCCH slot (for example, because non-deferred HARQ feedback is also scheduled to be transmitted in the PUCCH resource). In the example 800, the UE 120 is configured to continue to defer the deferred HARQ feedback where the deferred HARQ feedback is too large to be transmitted in the PUCCH resource in the target PUCCH slot where carrier switching is configured for the UE 120. In particular, in the example 800, the UE 120 adheres to or follows the semi-static time domain PUCCH cell pattern and selects subsequent PUCCH resource(s) on either component carrier (based on the semi-static time domain PUCCH cell pattern) for transmission of the deferred HARQ feedback based on the semi-static time domain PUCCH cell pattern.

At 802, the base station 110 may transmit a downlink transmission to the UE 120. The UE 120 may receive the downlink transmission on the CC0. Subsequently, a slot format change may occur on the CC0. For example, the slot format of slot 1 may be changed (the base station 110 may reconfigure the slot 1) from an uplink slot format or from a slot format that includes uplink symbols to a downlink slot format or to a slot format that does not include uplink symbols. As a result, at 804, a collision may occur in the slot 1 between transmission of the HARQ feedback and one or more downlink symbols in the slot 1. The UE 120 may determine to defer transmission of the HARQ feedback to a subsequent slot based on the collision. For example, at 806, the UE 120 may identify or select an initially scheduled PUCCH resource for HARQ deferral on the CC0 for transmission of deferred HARQ feedback for the downlink transmission. The initially scheduled PUCCH resource may include an uplink resource that includes time domain resources, frequency domain resources, or a combination thereof.

At 808, the UE 120 may perform a carrier switch after receiving the downlink transmission on the CC0 and after the collision. The carrier switch may include switching from the CC0 to the CC1. The carrier switch may include tuning or adjusting the modem 254, the antennas 252, other hardware of the UE 120, or a combination thereof to operate on the frequency range of the CC1. The UE 120 may perform the carrier switch based on a semi-static PUCCH cell pattern, based on another configuration, or based on signaling from the base station 110.

At 810, the UE 120 may determine or identify or select a target PUCCH resource for transmission of the deferred HARQ feedback on CC1 (for example, in Slot 4 on the CC1) instead of an initially scheduled PUCCH resource in Slot 5 on the CC0 at 508 based on the carrier switch. CC1 thus becomes the target component carrier for the deferred HARQ feedback based on the carrier switch from the CC0 to the CC1. The target PUCCH resource may include an uplink resource that includes time domain resources, frequency domain resources, or a combination thereof.

At 812, the UE 120 may continue to defer transmission of the deferred HARQ feedback to one or more subsequent PUCCH resources on the CC0, the CC1, or a combination thereof based on the deferred HARQ feedback exceeding the threshold in the target PUCCH resource. In other words, the UE 120 may adhere to or follow the semi-static time domain PUCCH cell pattern (the carrier switching pattern) and may identify or select the one or more subsequent PUCCH resources for the deferred HARQ feedback on the CC0, the CC1, or a combination thereof which the UE 120 may use to transmit (and the base station 110 may use to receive) the deferred HARQ feedback.

For example, the UE 120 may identify or select a subsequent PUCCH resource on the CC1 prior to a carrier switch from the CC1 to the CC0, and may transmit (and the base station 110 may receive) the deferred HARQ feedback in the subsequent PUCCH resource on the CC1 prior to the carrier switch. As another example, and as shown in FIG. 8, the UE 120 may perform a carrier switch from the CC1 to the CC0, the UE 120 may identify or select a subsequent PUCCH resource on the CC after the carrier switch, and the UE 120 may transmit (and the base station 110 may receive) the deferred HARQ feedback in the subsequent PUCCH resource on the CC0 after the carrier switch.

The UE 120 may determine that the HARQ feedback exceeds the threshold or the available size in the target PUCCH resource, and may determine to transmit the deferred HARQ feedback in the one or more subsequent PUCCH resources based on determining that the HARQ feedback exceeds the threshold or the available size in the target PUCCH resource. In particular, the UE 120 may determine that a quantity of bits for the deferred HARQ feedback exceeds a quantity of available bits in the target PUCCH resource.

In some aspects, the UE 120 is configured at the time of deployment with a configuration that indicates the UE 120 is to transmit deferred HARQ feedback in one or more subsequent PUCCH resources, and to adhere to the semi-static time domain PUCCH cell pattern, where the deferred HARQ feedback exceeds the available size of a target PUCCH resource. In some aspects, the base station 110 transmits (and the UE 120 receives) a configuration in an RRC communication, a DCI communication, a MAC-CE communication, or another type of downlink communication, and the UE 120 transmits (and the base station 110 receives) the deferred HARQ feedback in the subsequent PUCCH resource based on the configuration.

In some aspects, if non-deferred HARQ feedback for another downlink communication is also scheduled or configured to be transmitted in the target PUCCH resource, the UE 120 also may drop or refrain from transmitting the non-deferred HARQ feedback so that no HARQ feedback is transmitted in the target PUCCH resource. Alternatively, the UE 120 may transmit (and the base station 110 may receive) the non-deferred HARQ feedback in the target PUCCH resource. If non-deferred HARQ feedback that is scheduled to be transmitted in the target PUCCH resource also becomes deferred, the UE 120 may transmit (and the base station 110 may receive) this other deferred HARQ feedback in the one or more subsequent PUCCH resources on the CC0, the CC1, or a combination thereof, along with the deferred HARQ feedback. Moreover, the UE 120 may transmit (and the base station 110 may receive) other non-deferred HARQ feedback for another downlink communication in the one or more subsequent PUCCH resources on the CC0, the CC1, or a combination thereof, along with the deferred HARQ feedback, the other deferred HARQ feedback, or a combination thereof.

In some aspects, the UE 120 is scheduled or configured to transmit a plurality of repetitions of the HARQ feedback for the downlink transmission. The UE 120 may defer a subset of the repetitions (which become repetitions of deferred HARQ feedback) based on the collision, or may defer all repetitions of the HARQ feedback (for example, all repetitions of the HARQ feedback that have not already been transmitted). The techniques described in connection with example 800 may be extended to processing repetitions of deferred HARQ feedback. For example, the UE 120 may transmit (and the base station 110 may receive) at least a subset of repetitions of deferred HARQ feedback in the one or more subsequent PUCCH resources on the CC0, the CC1, or a combination thereof, based on the subset of repetitions of deferred HARQ feedback exceeding the available size (or threshold) in the target PUCCH resource. In aspects where repetitions of deferred HARQ feedback are deferred from the target PUCCH resource to the one or more subsequent PUCCH resources, the UE 120 may transmit (and the base station 110 may receive) repetitions of non-deferred HARQ feedback in a target PUCCH resource, repetitions of non-deferred HARQ feedback in the one or more subsequent PUCCH resources on the CC0, the CC1, or a combination thereof, repetitions of other deferred HARQ feedback in the one or more subsequent PUCCH resources on the CC0, the CC1, or a combination thereof, or a combination thereof along with the subset of repetitions of the deferred HARQ feedback.

In some aspects, the techniques of examples 600, 700, and 800 may be combined for processing of repetitions of deferred HARQ feedback. For example, the UE 120 may drop or refrain from transmitting a first subset of repetitions of deferred HARQ feedback in a target PUCCH resource on CC1 based on the repetitions of deferred HARQ feedback exceeding a threshold, may transmit a second subset of repetitions of deferred HARQ feedback (that is further deferred from the target PUCCH resource) in a subsequent PUCCH resource on CC1 based on the repetitions of deferred HARQ feedback exceeding a threshold, may transmit a second subset of repetitions of deferred HARQ feedback (that is further deferred from the target PUCCH resource) in a subsequent PUCCH resource on CC1 based on the repetitions of deferred HARQ feedback exceeding a threshold, or may use another combination of techniques described herein to process deferred HARQ feedback for carrier switching. In some aspects, the base station 110 may transmit (and the UE 120 may receive) a configuration indicating the combination of techniques that the UE 120 may use to process deferred HARQ feedback based on the configuration. In some aspects, the base station 110 may dynamically update the configuration to change or modify the combination of techniques that the UE 120 is to use to process deferred HARQ feedback.

Figure 9:
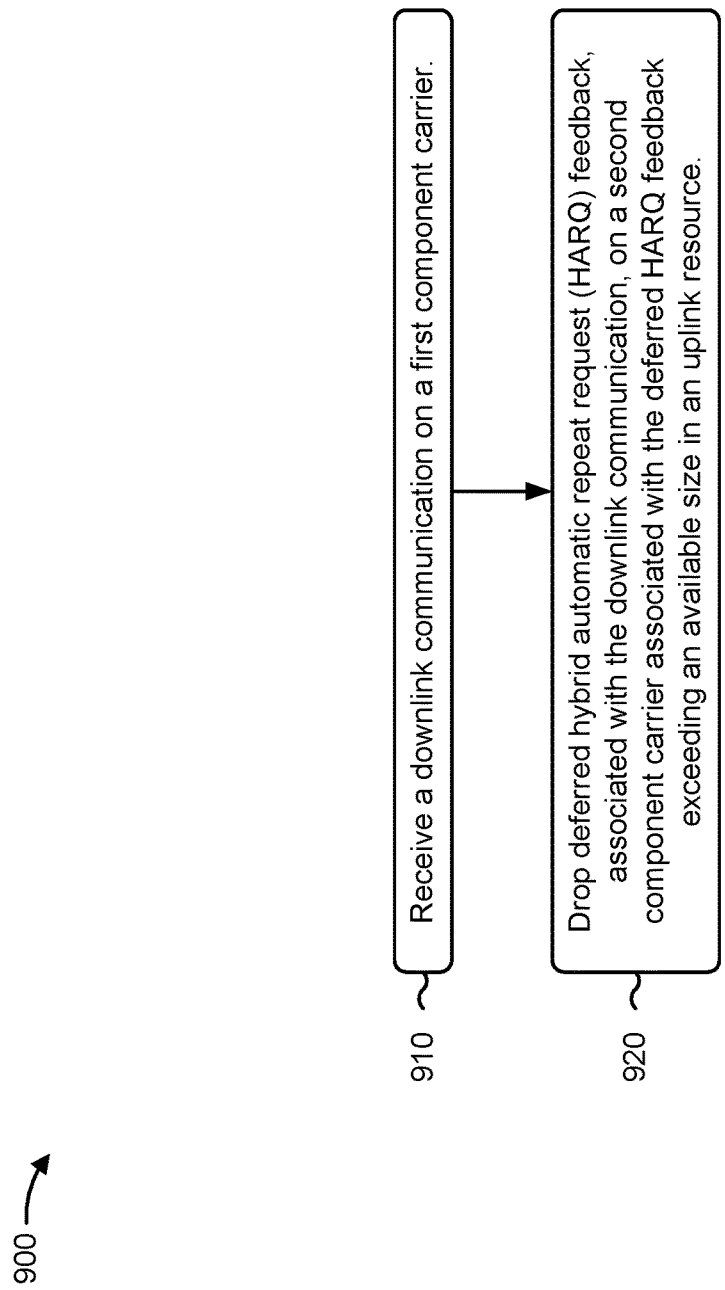
FIGS. 9-11 are diagrams illustrating example processes performed, for example, by a UE.

FIG. 9 is a diagram illustrating an example process 900 performed, for example, by UE. The process 900 is an example where the UE (for example, UE 120) performs operations associated with deferred HARQ feedback for carrier switching.

As shown in FIG. 9, in some aspects, the process 900 may include receiving a downlink communication on a first component carrier (block 910). For example, the UE (such as by using communication manager 140 or reception component 1402, depicted in FIG. 14) may receive a downlink communication on a first component carrier.

As further shown in FIG. 9, in some aspects, the process 900 may include dropping deferred HARQ feedback, associated with the downlink communication, on a second component carrier associated with the deferred HARQ feedback exceeding an available size in an uplink resource (block 920). For example, the UE (such as by using communication manager 140 or dropping component 1408, depicted in FIG. 14) may drop deferred HARQ feedback, associated with the downlink communication, on a second component carrier associated with the deferred HARQ feedback exceeding an available size in an uplink resource.

The process 900 may include additional aspects, such as any single aspect or any combination of aspects described in connection with the process 900 or in connection with one or more other processes described elsewhere herein.

In a first additional aspect, the deferred HARQ feedback is deferred from another uplink resource on the first component carrier, prior to the uplink resource on the second component carrier, based on a collision between a downlink resource on the first component carrier and the other uplink resource on the first component carrier.

In a second additional aspect, alone or in combination with the first aspect, the process 900 includes performing, associated with a semi-static PUCCH cell pattern, a carrier switch from the first component carrier to the second component carrier after receiving the downlink communication and prior to the uplink resource on the second component carrier.

In a third additional aspect, alone or in combination with one or more of the first and second aspects, the process 900 includes transmitting, in the uplink resource, non-deferred HARQ feedback associated with another downlink communication.

In a fourth additional aspect, alone or in combination with one or more of the first through third aspects, the process 900 includes dropping non-deferred HARQ feedback in the uplink resource associated with another downlink communication.

In a fifth additional aspect, alone or in combination with one or more of the first through fourth aspects, dropping the deferred HARQ feedback includes dropping the deferred HARQ feedback based on a quantity of bits associated with the deferred HARQ feedback exceeding a quantity of available bits in the uplink resource associated with the deferred HARQ feedback.

In a sixth additional aspect, alone or in combination with one or more of the first through fifth aspects, dropping the deferred HARQ feedback includes dropping the deferred HARQ feedback based on a configuration that is received in at least one of an RRC communication, a DCI communication, or a MAC-CE communication.

In a seventh additional aspect, alone or in combination with one or more of the first through sixth aspects, the second component carrier is associated with a target PUCCH carrier, and the uplink resource is included in a target slot on the target PUCCH carrier.

In an eighth additional aspect, alone or in combination with one or more of the first through seventh aspects, the deferred HARQ feedback includes a plurality of repetitions of the deferred HARQ feedback, and dropping the deferred HARQ feedback on the second component carrier includes dropping at least a subset of the plurality of repetitions of the deferred HARQ feedback on the second component carrier.

In a ninth additional aspect, alone or in combination with one or more of the first through eighth aspects, the process 900 includes transmitting, in another uplink resource after the uplink resource, another subset of the plurality of repetitions of the deferred HARQ feedback on at least one of the first component carrier, or the second component carrier.

In a tenth additional aspect, alone or in combination with one or more of the first through ninth aspects, the process 900 includes dropping non-deferred HARQ feedback in the uplink resource associated with another downlink communication.

In an eleventh additional aspect, alone or in combination with one or more of the first through tenth aspects, the process 900 includes transmitting non-deferred HARQ feedback in the uplink resource associated with another downlink communication.

In a twelfth additional aspect, alone or in combination with one or more of the first through eleventh aspects, the deferred HARQ feedback includes a plurality of repetitions of the deferred HARQ feedback, and dropping the deferred HARQ feedback on the second component carrier includes dropping at least a subset of the plurality of repetitions of the deferred HARQ feedback on the second component carrier based on a quantity of the plurality of repetitions of the deferred HARQ feedback, that collided with at least one of the downlink communication or another downlink communication, satisfying a threshold.

Although FIG. 9 shows example blocks of the process 900, in some aspects, the process 900 may include additional blocks, fewer blocks, different blocks, or differently arranged blocks than those depicted in FIG. 9. Additionally, or alternatively, two or more of the blocks of the process 900 may be performed in parallel.

Figure 10:
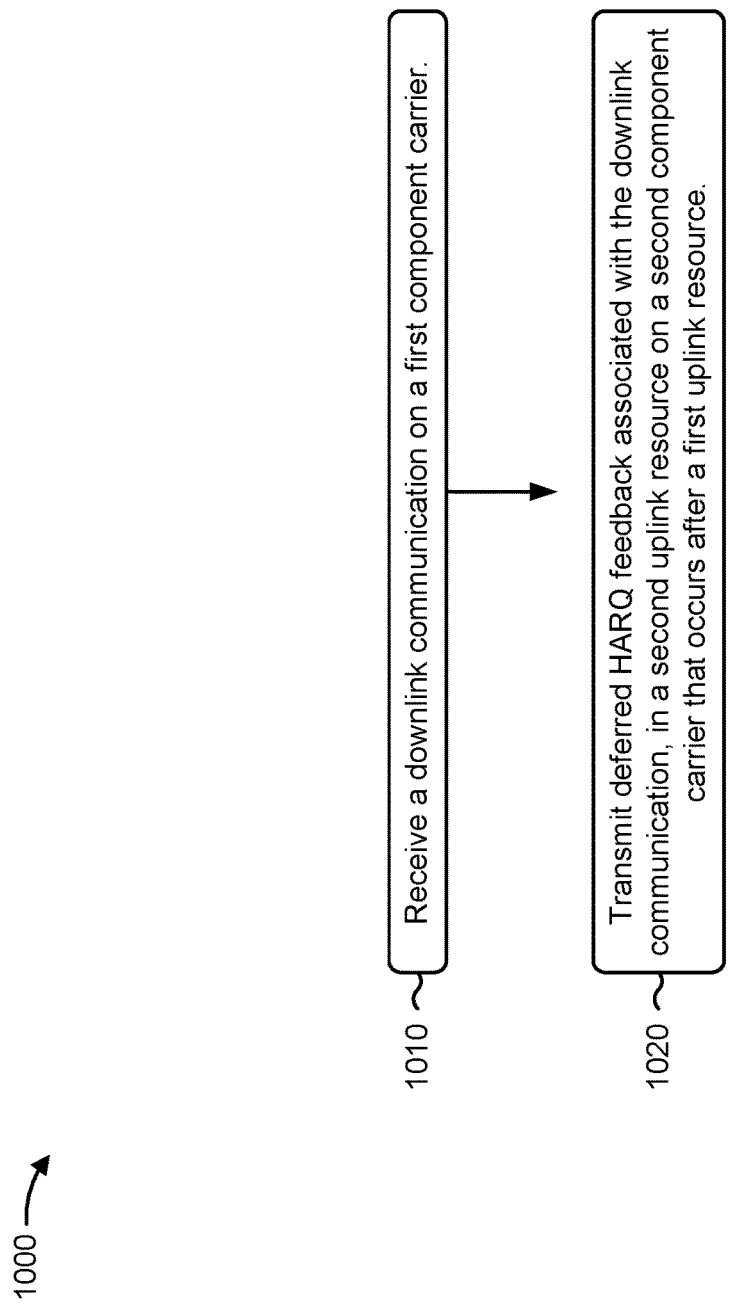

FIG. 10 is a diagram illustrating an example process 1000 performed, for example, by a UE. The process 1000 is an example where the UE (for example, UE 120) performs operations associated with deferred HARQ feedback for carrier switching.

As shown in FIG. 10, in some aspects, the process 1000 may include receiving a downlink communication on a first component carrier (block 1010). For example, the UE (such as by using communication manager 140 or reception component 1502, depicted in FIG. 15) may receive a downlink communication on a first component carrier.

As further shown in FIG. 10, in some aspects, the process 1000 may include transmitting deferred HARQ feedback associated with the downlink communication, in a second uplink resource on a second component carrier that occurs after a first uplink resource (block 1020). For example, the UE (such as by using communication manager 140 or transmission component 1504, depicted in FIG. 15) may transmit deferred HARQ feedback associated with the downlink communication, in a second uplink resource on a second component carrier that occurs after a first uplink resource. In some aspects, the first uplink resource is on the second component carrier. In some aspects, the UE transmits the deferred HARQ feedback in the second uplink resource associated with the deferred HARQ feedback exceeding a threshold in the first uplink resource.

The process 1000 may include additional aspects, such as any single aspect or any combination of aspects described in connection with the process 1000 or in connection with one or more other processes described elsewhere herein.

In a first additional aspect, the deferred HARQ feedback is deferred from a third uplink resource on the first component carrier, prior to the first uplink resource and the second uplink resource on the second component carrier, based on a collision between a downlink resource on the first component carrier and the third uplink resource on the first component carrier.

In a second additional aspect, alone or in combination with the first aspect, the process 1000 includes performing, associated with a semi-static PUCCH cell pattern, a carrier switch from the first component carrier to the second component carrier after receiving the downlink communication and prior to the second uplink resource on the second component carrier. In such aspects, the carrier switch may be performed prior to the first uplink resource and the second uplink resource on the second component carrier.

In a third additional aspect, alone or in combination with one or more of the first and second aspects, the process 1000 includes transmitting non-deferred HARQ feedback, associated with another downlink communication, in the first uplink resource.

In a fourth additional aspect, alone or in combination with one or more of the first through third aspects, the deferred HARQ feedback includes first deferred HARQ feedback associated with a first downlink communication, and the process 1000 includes transmitting, in the second uplink resource with the first deferred HARQ feedback, second deferred HARQ feedback associated with a second downlink communication.

In a fifth additional aspect, alone or in combination with one or more of the first through fourth aspects, the process 1000 includes transmitting, in the second uplink resource with the first deferred HARQ feedback and the second deferred HARQ feedback, non-deferred HARQ feedback, associated with a third downlink communication.

In a sixth additional aspect, alone or in combination with one or more of the first through fifth aspects, the process 1000 includes staying on the first component carrier until the deferred HARQ feedback is transmitted on the second component carrier.

In a seventh additional aspect, alone or in combination with one or more of the first through sixth aspects, transmitting the deferred HARQ feedback includes transmitting the deferred HARQ feedback in the second uplink resource based on a quantity of bits associated with the deferred HARQ feedback exceeding a quantity of available bits in the first uplink resource associated with the deferred HARQ feedback.

In an eighth additional aspect, alone or in combination with one or more of the first through seventh aspects, transmitting the deferred HARQ feedback in the second uplink resource includes transmitting the deferred HARQ feedback in the second uplink resource based on a configuration that is received in at least one of an RRC communication, a DCI communication, or a MAC-CE communication.

In a ninth additional aspect, alone or in combination with one or more of the first through eighth aspects, the second component carrier is associated with a target PUCCH carrier, where the first uplink resource is included in a first target slot on the target PUCCH carrier, and where the second uplink resource is included in a second target slot on the target PUCCH carrier.

In a tenth additional aspect, alone or in combination with one or more of the first through ninth aspects, the deferred HARQ feedback includes a plurality of repetitions of the deferred HARQ feedback, and transmitting deferred HARQ feedback in the second uplink resource on the second component carrier includes transmitting at least a subset of the plurality of repetitions of the deferred HARQ feedback in the second uplink resource on the second component carrier.

In an eleventh additional aspect, alone or in combination with one or more of the first through tenth aspects, the process 1000 includes transmitting, in a third uplink resource on the first component carrier that occurs after the second uplink resource, another subset of the plurality of repetitions of the deferred HARQ feedback.

In a twelfth additional aspect, alone or in combination with one or more of the first through eleventh aspects, the process 1000 includes dropping another subset of the plurality of repetitions of the deferred HARQ feedback.

In a thirteenth additional aspect, alone or in combination with one or more of the first through twelfth aspects, the process 1000 includes transmitting a plurality of repetitions of a non-deferred HARQ feedback, associated with another downlink communication, in the first uplink resource.

In a fourteenth additional aspect, alone or in combination with one or more of the first through thirteenth aspects, the plurality of repetitions of the deferred HARQ feedback includes a first plurality of repetitions of first deferred HARQ feedback associated with a first downlink communication, and the process 1000 includes transmitting, in the second uplink resource along with at least a subset of the plurality of repetitions of the deferred HARQ feedback, at least a subset of a second plurality of repetitions of a second deferred HARQ feedback associated with a second downlink communication.

Although FIG. 10 shows example blocks of the process 1000, in some aspects, the process 1000 may include additional blocks, fewer blocks, different blocks, or differently arranged blocks than those depicted in FIG. 10. Additionally, or alternatively, two or more of the blocks of the process 1000 may be performed in parallel.

Figure 11:
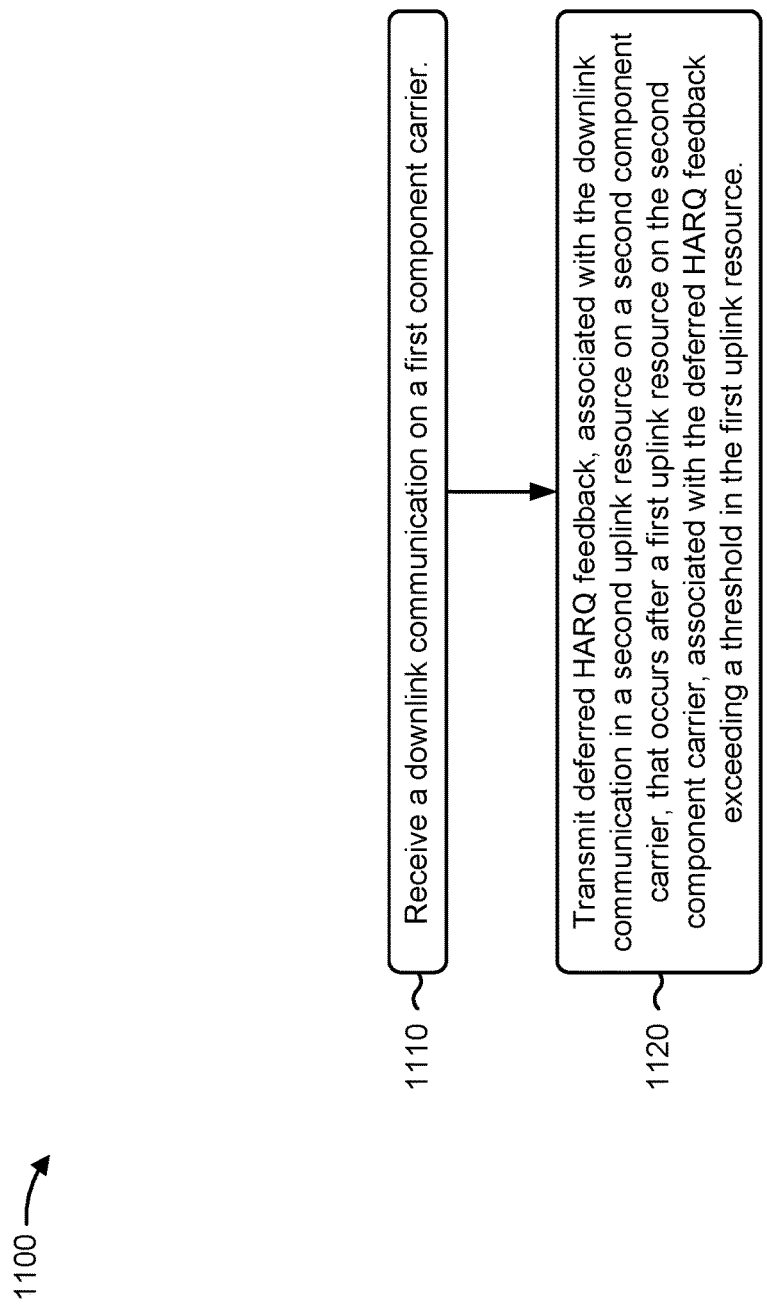

FIG. 11 is a diagram illustrating an example process 1100 performed, for example, by a UE. The process 1100 is an example where the UE (for example, UE 120) performs operations associated with deferred HARQ feedback for carrier switching.

As shown in FIG. 11, in some aspects, the process 1100 may include receiving a downlink communication on a first component carrier (block 1110). For example, the UE (such as by using communication manager 140 or reception component 1602, depicted in FIG. 16) may receive a downlink communication on a first component carrier.

As further shown in FIG. 11, in some aspects, the process 1100 may include transmitting deferred HARQ feedback, associated with the downlink communication in a second uplink resource on a second component carrier, that occurs after a first uplink resource on the second component carrier, associated with the deferred HARQ feedback exceeding a threshold in the first uplink resource (block 1120). For example, the UE (such as by using communication manager 140 or transmission component 1604, depicted in FIG. 16) may transmit deferred HARQ feedback, associated with the downlink communication in a second uplink resource on a second component carrier, that occurs after a first uplink resource on the second component carrier, associated with the deferred HARQ feedback exceeding a threshold in the first uplink resource.

The process 1100 may include additional aspects, such as any single aspect or any combination of aspects described in connection with the process 1100 or in connection with one or more other processes described elsewhere herein.

In a first additional aspect, the deferred HARQ feedback is deferred from a third uplink resource on the first component carrier, prior to the first uplink resource on the first component carrier and the second uplink resource on the second component carrier, based on a collision between a downlink resource on the first component carrier and the third uplink resource on the first component carrier.

In a second additional aspect, alone or in combination with the first aspect, the process 1100 includes performing, associated with a semi-static PUCCH cell pattern, a first carrier switch from the first component carrier to the second component carrier after receiving the downlink communication and prior to the first uplink resource on the second component carrier, and performing, associated with the semi-static PUCCH cell pattern, a second carrier switch from the second component carrier to the first component carrier after the first uplink resource on the second component carrier and prior to the second uplink resource on the first component carrier.

In a third additional aspect, alone or in combination with one or more of the first and second aspects, the process 1100 includes transmitting non-deferred HARQ feedback, associated with another downlink communication, in at least one of the first uplink resource on the second component carrier, or the second uplink resource, on the first component carrier, along with the deferred HARQ feedback.

In a fourth additional aspect, alone or in combination with one or more of the first through third aspects, the deferred HARQ feedback includes first deferred HARQ feedback associated with a first downlink communication, and the process 1100 includes transmitting, in the second uplink resource with the first deferred HARQ feedback, second deferred HARQ feedback associated with a second downlink communication.

In a fifth additional aspect, alone or in combination with one or more of the first through fourth aspects, the process 1100 includes transmitting, in the second uplink resource with the first deferred HARQ feedback and the second deferred HARQ feedback, non-deferred HARQ feedback, associated with a third downlink communication.

In a sixth additional aspect, alone or in combination with one or more of the first through fifth aspects, transmitting the deferred HARQ feedback includes transmitting the deferred HARQ feedback in the second uplink resource based on a quantity of bits associated with the deferred HARQ feedback exceeded a quantity of available bits in the first uplink resource associated with the deferred HARQ feedback.

In a seventh additional aspect, alone or in combination with one or more of the first through sixth aspects, transmitting the deferred HARQ feedback in the second uplink resource includes transmitting the deferred HARQ feedback in the second uplink resource based on a configuration that is received in at least one of an RRC communication, a DCI communication, or a MAC-CE communication.

In an eighth additional aspect, alone or in combination with one or more of the first through seventh aspects, the deferred HARQ feedback includes a plurality of repetitions of the deferred HARQ feedback, and transmitting deferred HARQ feedback in the second uplink resource on the first component carrier includes transmitting at least a subset of the plurality of repetitions of the deferred HARQ feedback in the second uplink resource on the first component carrier.

In a ninth additional aspect, alone or in combination with one or more of the first through eighth aspects, the process 1100 includes transmitting, in a third uplink resource after the first uplink resource, another subset of the plurality of repetitions of the deferred HARQ feedback on the second component carrier that occurs after the first uplink resource.

In a tenth additional aspect, alone or in combination with one or more of the first through ninth aspects, the process 1100 includes dropping another subset of the plurality of repetitions of the deferred HARQ feedback.

In an eleventh additional aspect, alone or in combination with one or more of the first through tenth aspects, the process 1100 includes transmitting a plurality of repetitions of a non-deferred HARQ feedback, associated with another downlink communication, in the first uplink resource on the second component carrier.

In a twelfth additional aspect, alone or in combination with one or more of the first through eleventh aspects, the plurality of repetitions of the deferred HARQ feedback includes a first plurality of repetitions of first deferred HARQ feedback associated with a first downlink communication, and the process 1100 includes transmitting, in the second uplink resource on the first component carrier along with at least a subset of the plurality of repetitions of the deferred HARQ feedback, at least a subset of a second plurality of repetitions of a second deferred HARQ feedback associated with a second downlink communication.

Although FIG. 11 shows example blocks of the process 1100, in some aspects, the process 1100 may include additional blocks, fewer blocks, different blocks, or differently arranged blocks than those depicted in FIG. 11. Additionally, or alternatively, two or more of the blocks of the process 1100 may be performed in parallel.

Figure 12:
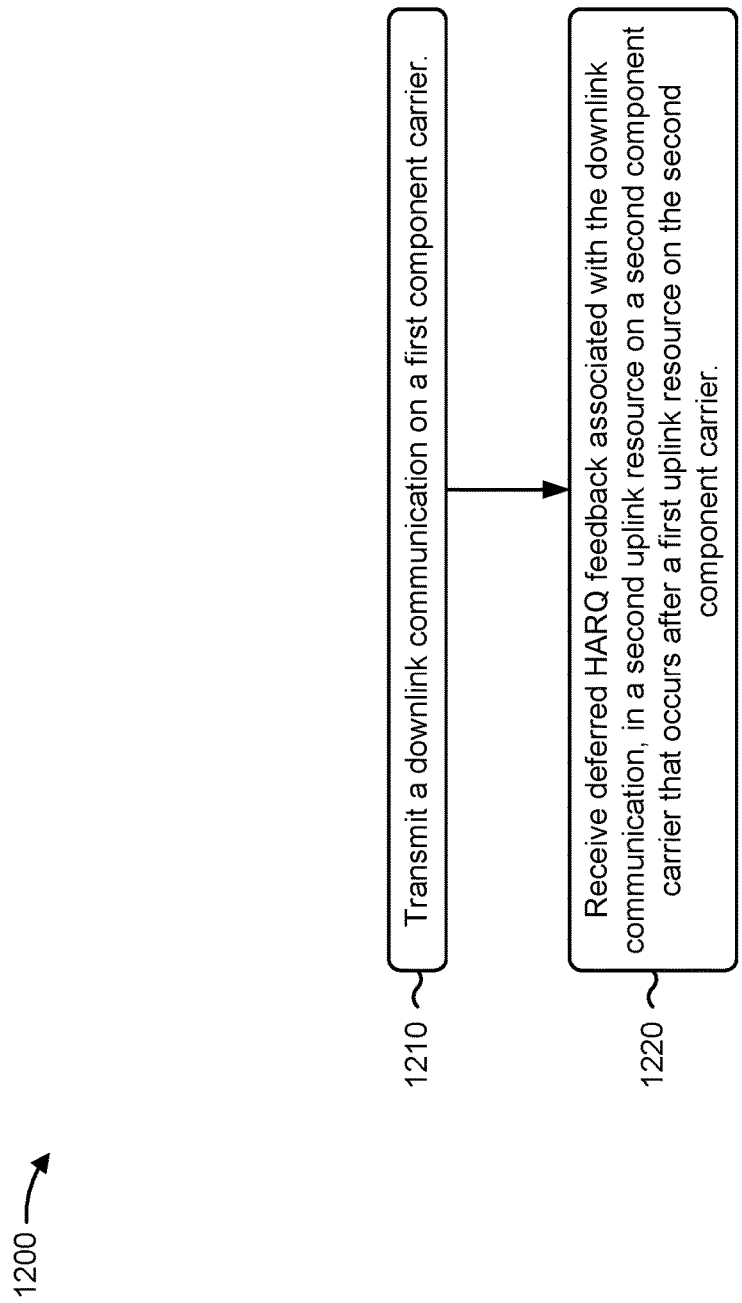
FIGS. 12 and 13 are diagrams illustrating example processes performed, for example, by a BS.

FIG. 12 is a diagram illustrating an example process 1200 performed, for example, by a BS. The process 1200 is an example where the base station (for example, base station 110) performs operations associated with deferred HARQ feedback for carrier switching.

As shown in FIG. 12, in some aspects, the process 1200 may include transmitting a downlink communication on a first component carrier (block 1210). For example, the base station (such as by using communication manager 150 or transmission component 1704, depicted in FIG. 17) may transmit a downlink communication on a first component carrier.

As further shown in FIG. 12, in some aspects, the process 1200 may include receiving deferred HARQ feedback associated with the downlink communication, in a second uplink resource on a second component carrier that occurs after a first uplink resource on the second component carrier (block 1220). For example, the base station (such as by using communication manager 150 or reception component 1702, depicted in FIG. 17) may receive deferred HARQ feedback associated with the downlink communication, in a second uplink resource on a second component carrier that occurs after a first uplink resource on the second component carrier.

The process 1200 may include additional aspects, such as any single aspect or any combination of aspects described in connection with the process 1200 or in connection with one or more other processes described elsewhere herein.

In a first additional aspect, the deferred HARQ feedback is deferred from a third uplink resource on the first component carrier, prior to the first uplink resource and the second uplink resource on the second component carrier, based on a collision between a downlink resource on the first component carrier and the third uplink resource on the first component carrier.

In a second additional aspect, alone or in combination with the first aspect, the process 1200 includes receiving non-deferred HARQ feedback, associated with another downlink communication, in the first uplink resource.

In a third additional aspect, alone or in combination with one or more of the first and second aspects, the deferred HARQ feedback includes first deferred HARQ feedback associated with a first downlink communication, and the process 1200 includes receiving, in the second uplink resource with the first deferred HARQ feedback, second deferred HARQ feedback associated with a second downlink communication.

In a fourth additional aspect, alone or in combination with one or more of the first through third aspects, the process 1200 includes receiving, in the second uplink resource with the first deferred HARQ feedback and the second deferred HARQ feedback, non-deferred HARQ feedback, associated with a third downlink communication.

In a fifth additional aspect, alone or in combination with one or more of the first through fourth aspects, receiving the deferred HARQ feedback includes receiving the deferred HARQ feedback in the second uplink resource based on a quantity of bits associated with the deferred HARQ feedback exceeding a quantity of available bits in the first uplink resource associated with the deferred HARQ feedback.

In a sixth additional aspect, alone or in combination with one or more of the first through fifth aspects, the process 1200 includes transmitting a configuration, associated with providing the deferred HARQ feedback, in at least one of an RRC communication, a DCI communication, or a MAC-CE communication.

In a seventh additional aspect, alone or in combination with one or more of the first through sixth aspects, the second component carrier is associated with a target physical uplink control channel (PUCCH) carrier, where the first uplink resource is included in a first target slot on the target PUCCH carrier, and where the second uplink resource is included in a second target slot on the target PUCCH carrier.

In an eighth additional aspect, alone or in combination with one or more of the first through seventh aspects, the deferred HARQ feedback includes a plurality of repetitions of the deferred HARQ feedback, and receiving deferred HARQ feedback in the second uplink resource on the second component carrier includes receiving at least a subset of the plurality of repetitions of the deferred HARQ feedback in the second uplink resource on the second component carrier.

In a ninth additional aspect, alone or in combination with one or more of the first through eighth aspects, the process 1200 includes receiving, in a third uplink resource on the first component carrier that occurs after the second uplink resource, another subset of the plurality of repetitions of the deferred HARQ feedback.

In a tenth additional aspect, alone or in combination with one or more of the first through ninth aspects, the process 1200 includes receiving a plurality of repetitions of a non-deferred HARQ feedback, associated with another downlink communication, in the first uplink resource.

In an eleventh additional aspect, alone or in combination with one or more of the first through tenth aspects, the plurality of repetitions of the deferred HARQ feedback includes a first plurality of repetitions of first deferred HARQ feedback associated with a first downlink communication, and the process 1200 includes receiving, in the second uplink resource along with at least a subset of the plurality of repetitions of the deferred HARQ feedback, at least a subset of a second plurality of repetitions of a second deferred HARQ feedback associated with a second downlink communication.

Although FIG. 12 shows example blocks of the process 1200, in some aspects, the process 1200 may include additional blocks, fewer blocks, different blocks, or differently arranged blocks than those depicted in FIG. 12. Additionally, or alternatively, two or more of the blocks of the process 1200 may be performed in parallel.

Figure 13:
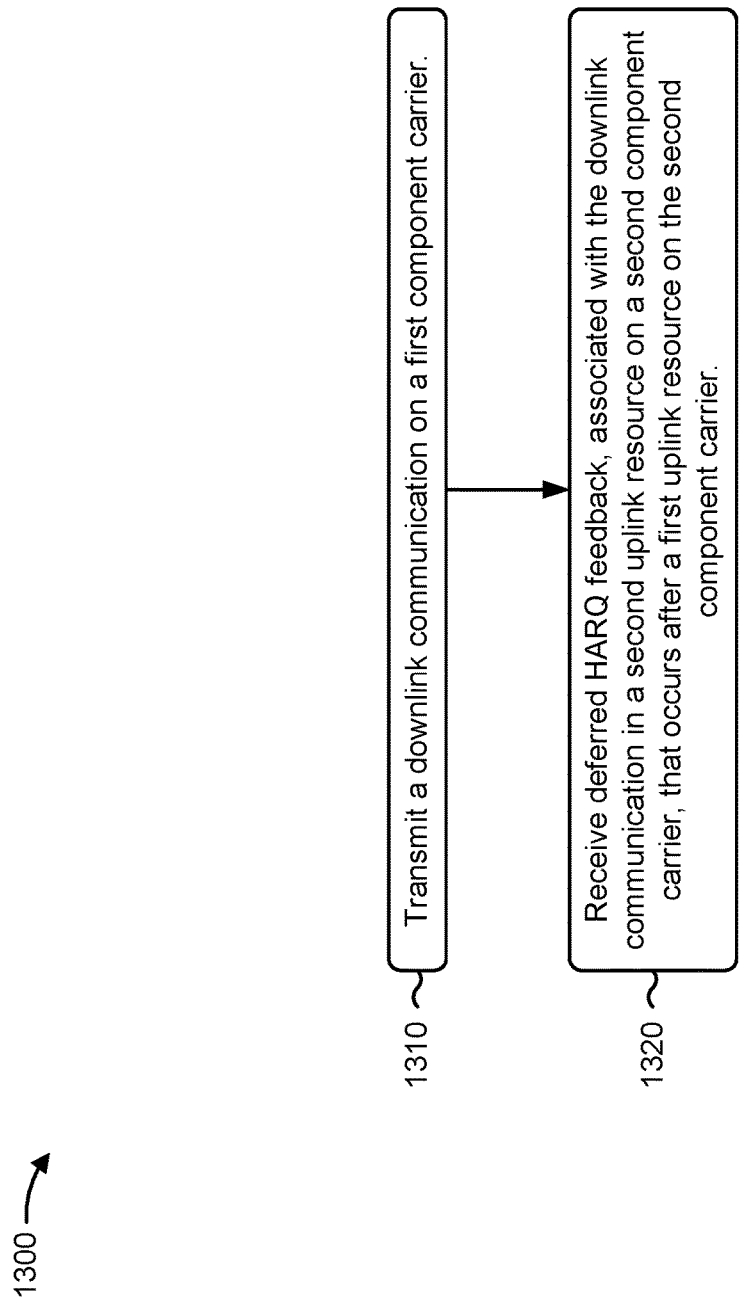

FIG. 13 is a diagram illustrating an example process 1300 performed, for example, by a BS. The process 1300 is an example where the base station (for example, base station 110) performs operations associated with deferred HARQ feedback for carrier switching.

As shown in FIG. 13, in some aspects, the process 1300 may include transmitting a downlink communication on a first component carrier (block 1310). For example, the base station (such as by using communication manager 150 or transmission component 1804, depicted in FIG. 18) may transmit a downlink communication on a first component carrier.

As further shown in FIG. 13, in some aspects, the process 1300 may include receiving deferred HARQ feedback, associated with the downlink communication in a second uplink resource on a second component carrier, that occurs after a first uplink resource on the second component carrier (block 1320). For example, the base station (such as by using communication manager 150 or reception component 1802, depicted in FIG. 18) may receive deferred HARQ feedback, associated with the downlink communication in a second uplink resource on a second component carrier, that occurs after a first uplink resource on the second component carrier.

The process 1300 may include additional aspects, such as any single aspect or any combination of aspects described in connection with the process 1300 or in connection with one or more other processes described elsewhere herein.

In a first additional aspect, the deferred HARQ feedback is deferred from a third uplink resource on the first component carrier, prior to the first uplink resource on the first component carrier and the second uplink resource on the second component carrier, based on a collision between a downlink resource on the first component carrier and the third uplink resource on the first component carrier.

In a second additional aspect, alone or in combination with the first aspect, the process 1300 includes receiving non-deferred HARQ feedback, associated with another downlink communication, in at least one of the first uplink resource on the second component carrier, or the second uplink resource, on the first component carrier, along with the deferred HARQ feedback.

In a third additional aspect, alone or in combination with one or more of the first and second aspects, the deferred HARQ feedback includes first deferred HARQ feedback associated with a first downlink communication, and the process 1300 includes receiving, in the second uplink resource with the first deferred HARQ feedback, second deferred HARQ feedback associated with a second downlink communication.

In a fourth additional aspect, alone or in combination with one or more of the first through third aspects, the process 1300 includes receiving, in the second uplink resource with the first deferred HARQ feedback and the second deferred HARQ feedback, non-deferred HARQ feedback, associated with a third downlink communication.

In a fifth additional aspect, alone or in combination with one or more of the first through fourth aspects, receiving the deferred HARQ feedback includes receiving the deferred HARQ feedback in the second uplink resource based on a quantity of bits associated with the deferred HARQ feedback exceeded a quantity of available bits in the first uplink resource associated with the deferred HARQ feedback.

In a sixth additional aspect, alone or in combination with one or more of the first through fifth aspects, the process 1300 includes transmitting a configuration, associated with providing the deferred HARQ feedback, in at least one of an RRC communication, a DCI communication, or a MAC-CE communication.

In a seventh additional aspect, alone or in combination with one or more of the first through sixth aspects, the deferred HARQ feedback includes a plurality of repetitions of the deferred HARQ feedback, and receiving deferred HARQ feedback in the second uplink resource on the first component carrier includes receiving at least a subset of the plurality of repetitions of the deferred HARQ feedback in the second uplink resource on the first component carrier.

In an eighth additional aspect, alone or in combination with one or more of the first through seventh aspects, the process 1300 includes receiving, in a third uplink resource after the first uplink resource, another subset of the plurality of repetitions of the deferred HARQ feedback on the second component carrier that occurs after the first uplink resource.

In a ninth additional aspect, alone or in combination with one or more of the first through eighth aspects, the process 1300 includes receiving a plurality of repetitions of a non-deferred HARQ feedback, associated with another downlink communication, in the first uplink resource on the second component carrier.

In a tenth additional aspect, alone or in combination with one or more of the first through ninth aspects, the plurality of repetitions of the deferred HARQ feedback includes a first plurality of repetitions of first deferred HARQ feedback associated with a first downlink communication, and the process 1300 includes receiving, in the second uplink resource on the first component carrier along with at least a subset of the plurality of repetitions of the deferred HARQ feedback, at least a subset of a second plurality of repetitions of a second deferred HARQ feedback associated with a second downlink communication.

Although FIG. 13 shows example blocks of the process 1300, in some aspects, the process 1300 may include additional blocks, fewer blocks, different blocks, or differently arranged blocks than those depicted in FIG. 13. Additionally, or alternatively, two or more of the blocks of the process 1300 may be performed in parallel.

Figure 14:
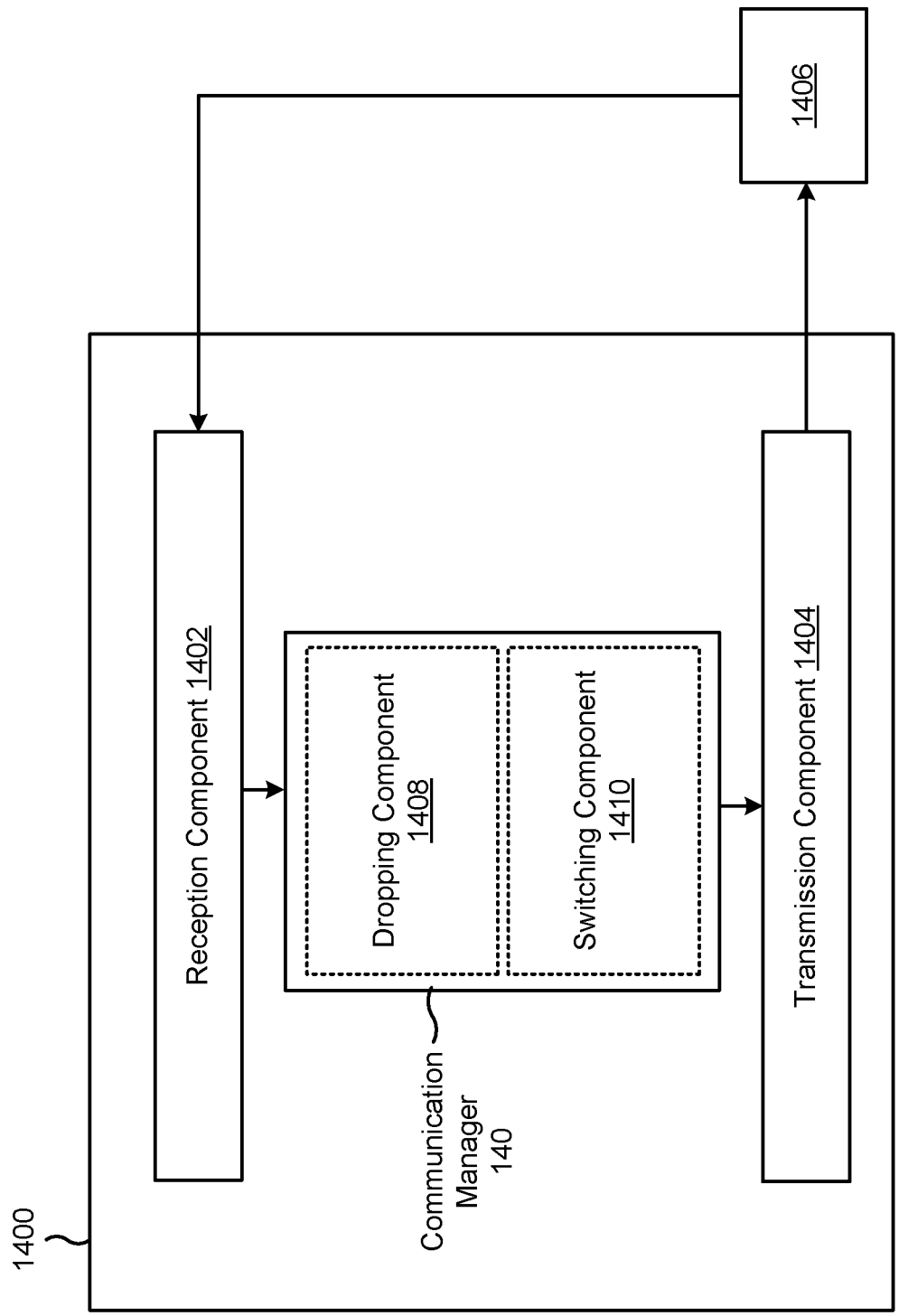

FIG. 14 is a diagram of an example apparatus 1400 for wireless communication. The apparatus 1400 may be a UE (such as a UE 120), or a UE may include the apparatus 1400. In some aspects, the apparatus 1400 includes a reception component 1402 and a transmission component 1404, which may be in communication with one another (for example, via one or more buses or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140 may include one or more of a dropping component 1408 or a switching component 1410, among other examples.

In some aspects, the apparatus 1400 may be configured to perform one or more operations described herein in connection with FIGS. 3-8. Additionally, or alternatively, the apparatus 1400 may be configured to perform one or more processes described herein, such as process 900 of FIG. 9, or a combination thereof. In some aspects, the apparatus 1400 or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The reception component 1402 may receive (for example, from the apparatus 1406) a downlink communication on a first component carrier. The dropping component 1408 may drop deferred HARQ feedback, associated with the downlink communication, on a second component carrier associated with the deferred HARQ feedback exceeding an available size in an uplink resource.

The switching component 1410 may perform, associated with a semi-static PUCCH cell pattern, a carrier switch from the first component carrier to the second component carrier after receiving the downlink communication and prior to the uplink resource on the second component carrier.

The transmission component 1404 may transmit, in the uplink resource, non-deferred HARQ feedback associated with another downlink communication.

The dropping component 1408 may drop non-deferred HARQ feedback in the uplink resource associated with another downlink communication.

The transmission component 1404 may transmit (for example, to the apparatus 1406), in another uplink resource after the uplink resource, another subset of the plurality of repetitions of the deferred HARQ feedback on at least one of the first component carrier, or the second component carrier.

The dropping component 1408 may drop non-deferred HARQ feedback in the uplink resource associated with another downlink communication.

The transmission component 1404 may transmit (for example, to the apparatus 1406) non-deferred HARQ feedback in the uplink resource associated with another downlink communication.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
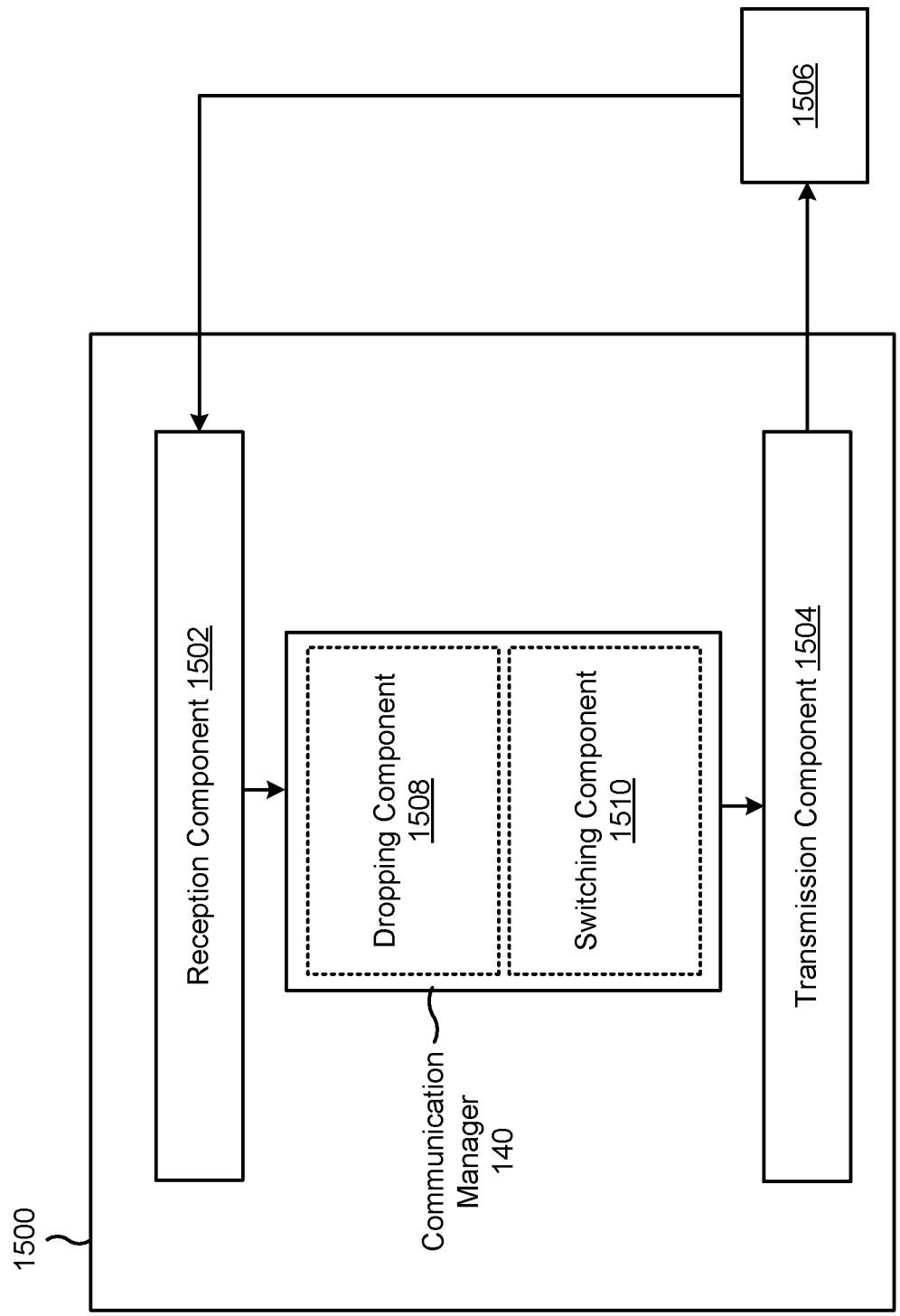

FIG. 15 is a diagram of an example apparatus 1500 for wireless communication. The apparatus 1500 may be a UE (a UE 120), or a UE may include the apparatus 1500. In some aspects, the apparatus 1500 includes a reception component 1502 and a transmission component 1504, which may be in communication with one another (for example, via one or more buses or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include one or more of a dropping component 1508 or a switching component 1510, among other examples.

In some aspects, the apparatus 1500 may be configured to perform one or more operations described herein in connection with FIGS. 3-8. Additionally, or alternatively, the apparatus 1500 may be configured to perform one or more processes described herein, such as process 1000 of FIG. 10. In some aspects, the apparatus 1500 or one or more components shown in FIG. 15 may include one or more components of the UE described in connection with FIG. 2. Additionally, or alternatively, one or more components shown in FIG. 15 may be implemented within one or more components described in connection with FIG. 2.

Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The reception component 1502 may receive (for example, from the apparatus 1506) a downlink communication on a first component carrier. The transmission component 1504 may transmit (for example, to the apparatus 1506) deferred HARQ feedback associated with the downlink communication, in a second uplink resource on a second component carrier that occurs after a first uplink resource. In some aspects, the first uplink resource is on the second component carrier. In some aspects, the apparatus 1500 transmits the deferred HARQ feedback in the second uplink resource associated with the deferred HARQ feedback exceeding a threshold in the first uplink resource.

The switching component 1510 may perform, associated with a semi-static PUCCH cell pattern, a carrier switch from the first component carrier to the second component carrier after the reception component 1502 receives the downlink communication and prior to the second uplink resource on the second component carrier. In such aspects, the carrier switch may be performed prior to the first uplink resource and the second uplink resource on the second component carrier.

The transmission component 1504 may transmit (for example, to the apparatus 1506) non-deferred HARQ feedback, associated with another downlink communication, in the first uplink resource.

The transmission component 1504 may transmit (for example to the apparatus 1506), in the second uplink resource with the first deferred HARQ feedback and the second deferred HARQ feedback, non-deferred HARQ feedback, associated with a third downlink communication.

The switching component 1510 may stay on the first component carrier until the deferred HARQ feedback is transmitted by the transmission component 1504 on the second component carrier.

The transmission component 1504 may transmit (for example, to the apparatus 1506), in a third uplink resource on the first component carrier that occurs after the second uplink resource, another subset of the plurality of repetitions of the deferred HARQ feedback.

The dropping component 1508 may drop another subset of the plurality of repetitions of the deferred HARQ feedback.

The transmission component 1504 may transmit (to the apparatus 1506) a plurality of repetitions of a non-deferred HARQ feedback, associated with another downlink communication, in the first uplink resource.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
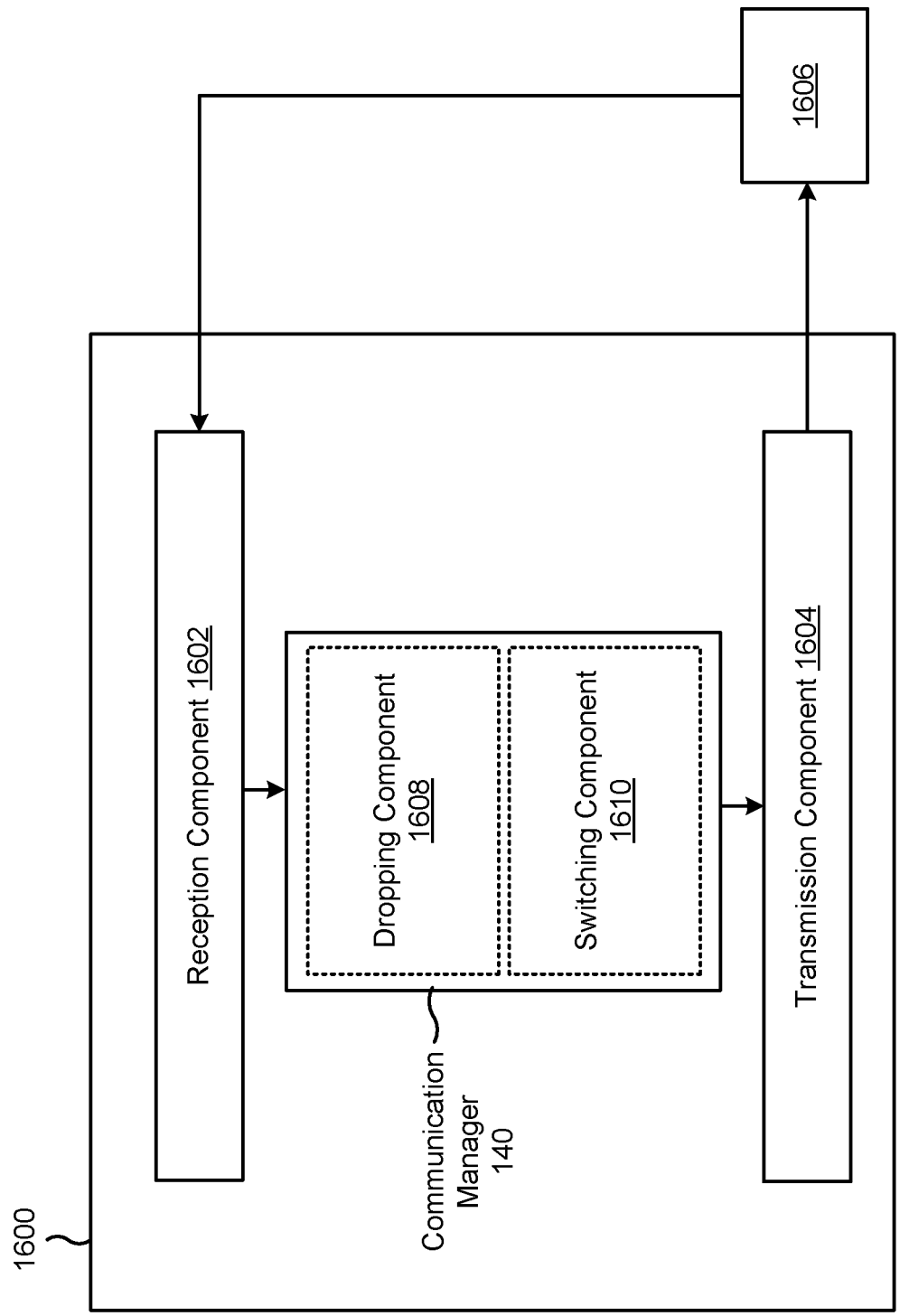

FIG. 16 is a diagram of an example apparatus 1600 for wireless communication. The apparatus 1600 may be a UE (a UE 120), or a UE may include the apparatus 1600. In some aspects, the apparatus 1600 includes a reception component 1602 and a transmission component 1604, which may be in communication with one another (for example, via one or more buses or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 140. The communication manager 140 may include one or more of a dropping component 1608 or a switching component 1610, among other examples.

In some aspects, the apparatus 1600 may be configured to perform one or more operations described herein in connection with FIGS. 3-8. Additionally, or alternatively, the apparatus 1600 may be configured to perform one or more processes described herein, such as process 1100 of FIG. 11. In some aspects, the apparatus 1600 or one or more components shown in FIG. 16 may include one or more components of the UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the UE described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the UE described in connection with FIG. 2. In some aspects, the transmission component 1604 may be co-located with the reception component 1602 in a transceiver.

The reception component 1602 may receive (for example, from the apparatus 1606) a downlink communication on a first component carrier. The transmission component 1604 may transmit (for example, to the apparatus 1606) deferred HARQ feedback, associated with the downlink communication in a second uplink resource on a second component carrier, that occurs after a first uplink resource on the second component carrier, associated with the deferred HARQ feedback exceeding a threshold in the first uplink resource.

The switching component 1610 may perform, associated with a semi-static PUCCH cell pattern, a first carrier switch from the first component carrier to the second component carrier after receiving the downlink communication and prior to the first uplink resource on the second component carrier.

The switching component 1610 may perform, associated with the semi-static PUCCH cell pattern, a second carrier switch from the second component carrier to the first component carrier after the first uplink resource on the second component carrier and prior to the second uplink resource on the first component carrier.

The transmission component 1604 may transmit (for example to the apparatus 1606) non-deferred HARQ feedback, associated with another downlink communication, in at least one of the first uplink resource on the second component carrier, or the second uplink resource, on the first component carrier, along with the deferred HARQ feedback.

The transmission component 1604 may transmit (for example, to the apparatus 1606), in the second uplink resource with the first deferred HARQ feedback and the second deferred HARQ feedback, non-deferred HARQ feedback, associated with a third downlink communication.

The transmission component 1604 may transmit (for example, to the apparatus 1606), in a third uplink resource after the first uplink resource, another subset of the plurality of repetitions of the deferred HARQ feedback on the second component carrier that occurs after the first uplink resource.

The dropping component 1608 may drop another subset of the plurality of repetitions of the deferred HARQ feedback.

The transmission component 1604 may transmit (for example, to the apparatus 1606) a plurality of repetitions of a non-deferred HARQ feedback, associated with another downlink communication, in the first uplink resource on the second component carrier.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
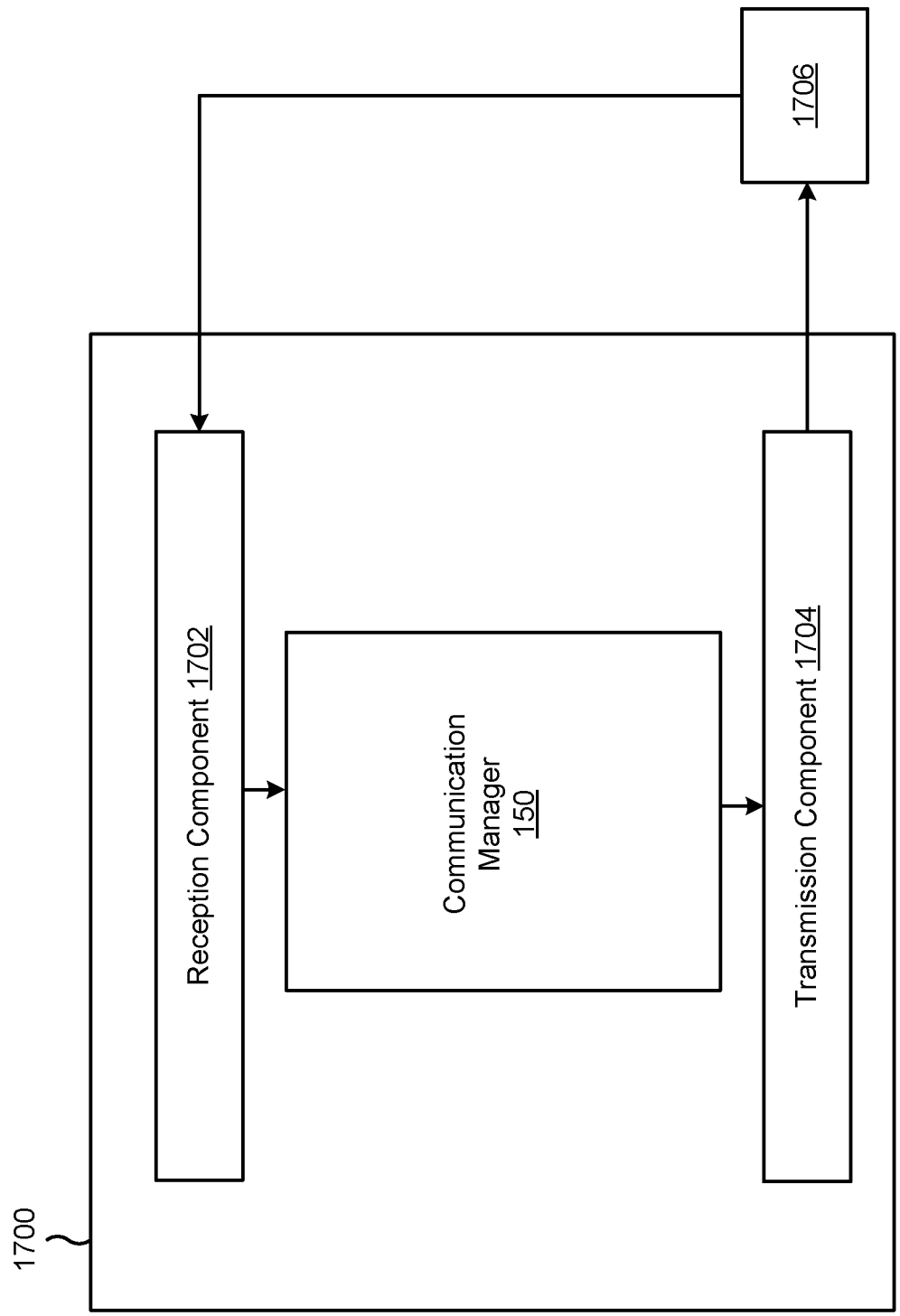

FIG. 17 is a diagram of an example apparatus 1700 for wireless communication. The apparatus 1700 may be a base station (a base station 110, a DU 330, an RU 340, a CU 310), or a base station may include the apparatus 1700. In some aspects, the apparatus 1700 includes a reception component 1702 and a transmission component 1704, which may be in communication with one another (for example, via one or more buses or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 150.

In some aspects, the apparatus 1700 may be configured to perform one or more operations described herein in connection with FIGS. 3-8. Additionally, or alternatively, the apparatus 1700 may be configured to perform one or more processes described herein, such as process 1200 of FIG. 12. In some aspects, the apparatus 1700 or one or more components shown in FIG. 17 may include one or more components of the base station described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the base station described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the base station described in connection with FIG. 2. In some aspects, the transmission component 1704 may be co-located with the reception component 1702 in a transceiver.

The transmission component 1704 may transmit (for example, to the apparatus 1706) a downlink communication on a first component carrier. The reception component 1702 may receive (for example, from the apparatus 1706) deferred HARQ feedback associated with the downlink communication, in a second uplink resource on a second component carrier that occurs after a first uplink resource on the second component carrier.

The reception component 1702 may receive (for example, from the apparatus 1706) non-deferred HARQ feedback, associated with another downlink communication, in the first uplink resource.

The reception component 1702 may receive (for example, from the apparatus 1706), in the second uplink resource with the first deferred HARQ feedback and the second deferred HARQ feedback, non-deferred HARQ feedback, associated with a third downlink communication.

The transmission component 1704 may transmit (for example, to the apparatus 1706) a configuration, associated with providing the deferred HARQ feedback, in at least one of a RRC communication, a DCI communication, or a MAC-CE communication.

The reception component 1702 may receive (for example, from the apparatus 1706), in a third uplink resource on the first component carrier that occurs after the second uplink resource, another subset of the plurality of repetitions of the deferred HARQ feedback.

The reception component 1702 may receive (for example, from the apparatus 1706) a plurality of repetitions of a non-deferred HARQ feedback, associated with another downlink communication, in the first uplink resource.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

FIG. 18 is a diagram of an example apparatus 1800 for wireless communication. The apparatus 1800 may be a base station, or a base station may include the apparatus 1800. In some aspects, the apparatus 1800 includes a reception component 1802 and a transmission component 1804, which may be in communication with one another (for example, via one or more buses or one or more other components). As shown, the apparatus 1800 may communicate with another apparatus 1806 (such as a UE, a base station, or another wireless communication device) using the reception component 1802 and the transmission component 1804. As further shown, the apparatus 1800 may include the communication manager 150.

In some aspects, the apparatus 1800 may be configured to perform one or more operations described herein in connection with FIGS. 3-8. Additionally, or alternatively, the apparatus 1800 may be configured to perform one or more processes described herein, such as process 1300 of FIG. 13. In some aspects, the apparatus 1800 or one or more components shown in FIG. 18 may include one or more components of the base station described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a modem, a demodulator, a MIMO detector, a receive processor, a controller/processor, a memory, or a combination thereof, of the base station described in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modem, a modulator, a transmit MIMO processor, a transmit processor, a controller/processor, a memory, or a combination thereof, of the base station described in connection with FIG. 2. In some aspects, the transmission component 1804 may be co-located with the reception component 1802 in a transceiver.

The transmission component 1804 may transmit (for example, to the apparatus 1806) a downlink communication on a first component carrier. The reception component 1802 may receive (for example, from the apparatus 1806) deferred HARQ feedback, associated with the downlink communication in a second uplink resource on a second component carrier, that occurs after a first uplink resource on the second component carrier.

The reception component 1802 may receive (for example, from the apparatus 1806) non-deferred HARQ feedback, associated with another downlink communication, in at least one of the first uplink resource on the second component carrier, or the second uplink resource, on the first component carrier, along with the deferred HARQ feedback.

The reception component 1802 may receive (for example, from the apparatus 1806), in the second uplink resource with the first deferred HARQ feedback and the second deferred HARQ feedback, non-deferred HARQ feedback, associated with a third downlink communication.

The transmission component 1804 may transmit (for example, to the apparatus 1806) a configuration, associated with providing the deferred HARQ feedback, in at least one of an RRC) communication, a DCI communication, or a MAC-CE communication.

The reception component 1802 may receive (for example, from the apparatus 1806), in a third uplink resource after the first uplink resource, another subset of the plurality of repetitions of the deferred HARQ feedback on the second component carrier that occurs after the first uplink resource.

The reception component 1802 may receive (for example, from the apparatus 1806) a plurality of repetitions of a non-deferred HARQ feedback, associated with another downlink communication, in the first uplink resource on the second component carrier.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The following provides an overview of some Aspects of the present disclosure:

Aspect 1: A method performed by a wireless communication apparatus, including: receiving a downlink communication on a first component carrier; and dropping deferred HARQ feedback, associated with the downlink communication, on a second component carrier associated with the deferred HARQ feedback exceeding an available size in an uplink resource.

Aspect 2: The method of Aspect 1, where the deferred HARQ feedback is deferred from another uplink resource on the first component carrier, prior to the uplink resource on the second component carrier, based at least in part on a collision between a downlink resource on the first component carrier and the other uplink resource on the first component carrier.

Aspect 3: The method of Aspect 1 or 2, further including: performing, associated with a semi-static PUCCH cell pattern, a carrier switch from the first component carrier to the second component carrier after receiving the downlink communication and prior to the uplink resource on the second component carrier.

Aspect 4: The method of one or more of Aspects 1-3, further including: transmitting, in the uplink resource, non-deferred HARQ feedback associated with another downlink communication.

Aspect 5: The method of one or more of Aspects 1-4, further including: dropping non-deferred HARQ feedback in the uplink resource associated with another downlink communication.

Aspect 6: The method of one or more of Aspects 1-5, where dropping the deferred HARQ feedback includes: dropping the deferred HARQ feedback based at least in part on a quantity of bits associated with the deferred HARQ feedback exceeding a quantity of available bits in the uplink resource associated with the deferred HARQ feedback.

Aspect 7: The method of one or more of Aspects 1-6, where dropping the deferred HARQ feedback includes: dropping the deferred HARQ feedback based at least in part on a configuration that is received in at least one of an RRC communication, a DCI communication, or a MAC-CE communication.

Aspect 8: The method of one or more of Aspects 1-7, where the second component carrier is associated with a target PUCCH carrier; and where the uplink resource is included in a target slot on the target PUCCH carrier.

Aspect 9: The method of one or more of Aspects 1-8, where the deferred HARQ feedback includes a plurality of repetitions of the deferred HARQ feedback; and where dropping the deferred HARQ feedback on the second component carrier includes: dropping at least a subset of the plurality of repetitions of the deferred HARQ feedback on the second component carrier.

Aspect 10: The method of Aspect 9, further including: transmitting, in another uplink resource after the uplink resource, another subset of the plurality of repetitions of the deferred HARQ feedback on at least one of: the first component carrier, or the second component carrier.

Aspect 11: The method of Aspect 9, further including: dropping non-deferred HARQ feedback in the uplink resource associated with another downlink communication.

Aspect 12: The method of Aspect 9, further including: dropping non-deferred HARQ feedback in the uplink resource associated with another downlink communication.

Aspect 13: The method of one or more of Aspects 1-12, where the deferred HARQ feedback includes a plurality of repetitions of the deferred HARQ feedback; and where dropping the deferred HARQ feedback on the second component carrier includes: dropping at least a subset of the plurality of repetitions of the deferred HARQ feedback on the second component carrier based at least in part on a quantity of the plurality of repetitions of the deferred HARQ feedback, that collided with at least one of the downlink communication or another downlink communication, satisfying a threshold.

Aspect 14: A method performed by a wireless communication apparatus, including: receiving a downlink communication on a first component carrier; and transmitting deferred HARQ feedback associated with the downlink communication, in a second uplink resource on a second component carrier that occurs after a first uplink resource. In such aspects, the first uplink resource may be on the second component carrier. Moreover, in such aspects, the wireless communication apparatus may transmit the deferred HARQ feedback in the second uplink resource associated with the deferred HARQ feedback exceeding a threshold in the first uplink resource.

Aspect 15: The method of Aspect 14, where the deferred HARQ feedback is deferred from a third uplink resource on the first component carrier, prior to the first uplink resource and the second uplink resource on the second component carrier, based at least in part on a collision between a downlink resource on the first component carrier and the third uplink resource on the first component carrier.

Aspect 16: The method of Aspect 14 or 15, further including: performing, associated with a semi-static PUCCH cell pattern, a carrier switch from the first component carrier to the second component carrier after receiving the downlink communication and prior to the second uplink resource on the second component carrier. In such aspects, the carrier switch may be performed prior to the first uplink resource and the second uplink resource on the second component carrier.

Aspect 17: The method of one or more of Aspects 14-16, further including: transmitting non-deferred HARQ feedback, associated with another downlink communication, in the first uplink resource.

Aspect 18: The method of one or more of Aspects 14-17, where the deferred HARQ feedback includes first deferred HARQ feedback associated with a first downlink communication; and where the method further includes: transmitting, in the second uplink resource with the first deferred HARQ feedback, second deferred HARQ feedback associated with a second downlink communication.

Aspect 19: The method of Aspect 18, further including: transmitting, in the second uplink resource with the first deferred HARQ feedback and the second deferred HARQ feedback, non-deferred HARQ feedback, associated with a third downlink communication.

Aspect 20: The method of one or more of Aspects 14-19, further including: staying on the first component carrier until the deferred HARQ feedback is transmitted on the second component carrier.

Aspect 21: The method of one or more of Aspects 14-21, where transmitting the deferred HARQ feedback includes: transmitting the deferred HARQ feedback in the second uplink resource based at least in part on a quantity of bits associated with the deferred HARQ feedback exceeding a quantity of available bits in the first uplink resource associated with the deferred HARQ feedback.

Aspect 22: The method of one or more of Aspects 14-22, where transmitting the deferred HARQ feedback in the second uplink resource includes: transmitting the deferred HARQ feedback in the second uplink resource based at least in part on a configuration that is received in at least one of an RRC communication, a DCI communication, or a MAC-CE communication.

Aspect 23: The method of one or more of Aspects 14-22, where the second component carrier is associated with a target PUCCH carrier; where the first uplink resource is included in a first target slot on the target PUCCH carrier; and where the second uplink resource is included in a second target slot on the target PUCCH carrier.

Aspect 24: The method of one or more of Aspects 14-23, where the deferred HARQ feedback includes a plurality of repetitions of the deferred HARQ feedback; and where transmitting deferred HARQ feedback in the second uplink resource on the second component carrier includes: transmitting at least a subset of the plurality of repetitions of the deferred HARQ feedback in the second uplink resource on the second component carrier.

Aspect 25: The method of Aspect 24, further including: transmitting, in a third uplink resource on the first component carrier that occurs after the second uplink resource, another subset of the plurality of repetitions of the deferred HARQ feedback.

Aspect 26: The method of Aspect 24 or 25, further including: dropping another subset of the plurality of repetitions of the deferred HARQ feedback.

Aspect 27: The method of Aspect 24, further including: transmitting a plurality of repetitions of a non-deferred HARQ feedback, associated with another downlink communication, in the first uplink resource.

Aspect 28: The method of one or more of Aspects 24-27, where the plurality of repetitions of the deferred HARQ feedback includes a first plurality of repetitions of first deferred HARQ feedback associated with a first downlink communication; and where the method further includes: transmitting, in the second uplink resource along with at least a subset of the plurality of repetitions of the deferred HARQ feedback, at least a subset of a second plurality of repetitions of a second deferred HARQ feedback associated with a second downlink communication.

Aspect 29: A method performed by a wireless communication apparatus, including: receiving a downlink communication on a first component carrier; and transmitting deferred HARQ feedback, associated with the downlink communication in a second uplink resource on a second component carrier, that occurs after a first uplink resource on the second component carrier, associated with the deferred HARQ feedback exceeding a threshold in the first uplink resource.

Aspect 30: The method of Aspect 29, where the deferred HARQ feedback is deferred from a third uplink resource on the first component carrier, prior to the first uplink resource on the first component carrier and the second uplink resource on the second component carrier, based at least in part on a collision between a downlink resource on the first component carrier and the third uplink resource on the first component carrier.

Aspect 31: The method of Aspect 29 or 30, further including: performing, associated with a semi-static PUCCH cell pattern, a first carrier switch from the first component carrier to the second component carrier after receiving the downlink communication and prior to the first uplink resource on the second component carrier; and performing, associated with the semi-static PUCCH cell pattern, a second carrier switch from the second component carrier to the first component carrier after the first uplink resource on the second component carrier and prior to the second uplink resource on the first component carrier.

Aspect 32: The method of one or more of Aspects 29-31, further including: transmitting non-deferred HARQ feedback, associated with another downlink communication, in at least one of: the first uplink resource on the second component carrier, or the second uplink resource, on the first component carrier, along with the deferred HARQ feedback.

Aspect 33: The method of one or more of Aspects 29-33, where the deferred HARQ feedback includes first deferred HARQ feedback associated with a first downlink communication; and where the method further includes: transmitting, in the second uplink resource with the first deferred HARQ feedback, second deferred HARQ feedback associated with a second downlink communication.

Aspect 34: The method of Aspect 33, further including: transmitting, in the second uplink resource with the first deferred HARQ feedback and the second deferred HARQ feedback, non-deferred HARQ feedback, associated with a third downlink communication.

Aspect 35: The method of one or more of Aspects 29-35, where transmitting the deferred HARQ feedback includes: transmitting the deferred HARQ feedback in the second uplink resource based at least in part on a quantity of bits associated with the deferred HARQ feedback exceeded a quantity of available bits in the first uplink resource associated with the deferred HARQ feedback.

Aspect 36: The method of one or more of Aspects 29-35, where transmitting the deferred HARQ feedback in the second uplink resource includes: transmitting the deferred HARQ feedback in the second uplink resource based at least in part on a configuration that is received in at least one of an RRC communication, a DCI communication, or a MAC-CE communication.

Aspect 37: The method of one or more of Aspects 29-36, where the deferred HARQ feedback includes a plurality of repetitions of the deferred HARQ feedback; and where transmitting deferred HARQ feedback in the second uplink resource on the first component carrier includes: transmitting at least a subset of the plurality of repetitions of the deferred HARQ feedback in the second uplink resource on the first component carrier.

Aspect 38: The method of Aspect 37, further including: transmitting, in a third uplink resource after the first uplink resource, another subset of the plurality of repetitions of the deferred HARQ feedback on the second component carrier that occurs after the first uplink resource.

Aspect 39: The method of Aspect 37 or 38, further including: dropping another subset of the plurality of repetitions of the deferred HARQ feedback.

Aspect 40: The method of one or more of Aspects 37-39, further including: transmitting a plurality of repetitions of a non-deferred HARQ feedback, associated with another downlink communication, in the first uplink resource on the second component carrier.

Aspect 41: The method of one or more of Aspects 29-40, where the plurality of repetitions of the deferred HARQ feedback includes a first plurality of repetitions of first deferred HARQ feedback associated with a first downlink communication; and where the method further includes: transmitting, in the second uplink resource on the first component carrier along with at least a subset of the plurality of repetitions of the deferred HARQ feedback, at least a subset of a second plurality of repetitions of a second deferred HARQ feedback associated with a second downlink communication.

Aspect 42: A method performed by a wireless communication apparatus, including: transmitting a downlink communication on a first component carrier; and receiving deferred HARQ feedback associated with the downlink communication, in a second uplink resource on a second component carrier that occurs after a first uplink resource on the second component carrier.

Aspect 43: The method of Aspect 42, where the deferred HARQ feedback is deferred from a third uplink resource on the first component carrier, prior to the first uplink resource and the second uplink resource on the second component carrier, based at least in part on a collision between a downlink resource on the first component carrier and the third uplink resource on the first component carrier.

Aspect 44: The method of Aspect 42 or 44, further including: receiving non-deferred HARQ feedback, associated with another downlink communication, in the first uplink resource.

Aspect 45: The method of one or more of Aspects 42-44, where the deferred HARQ feedback includes first deferred HARQ feedback associated with a first downlink communication; and where the method further includes: receiving, in the second uplink resource with the first deferred HARQ feedback, second deferred HARQ feedback associated with a second downlink communication.

Aspect 46: The method of one or more of Aspects 45, further including: receiving, in the second uplink resource with the first deferred HARQ feedback and the second deferred HARQ feedback, non-deferred HARQ feedback, associated with a third downlink communication.

Aspect 47: The method of one or more of Aspects 42-46, where receiving the deferred HARQ feedback includes: receiving the deferred HARQ feedback in the second uplink resource based at least in part on a quantity of bits associated with the deferred HARQ feedback exceeding a quantity of available bits in the first uplink resource associated with the deferred HARQ feedback.

Aspect 48: The method of one or more of Aspects 42-47, further including: transmitting a configuration, associated with providing the deferred HARQ feedback, in at least one of an RRC communication, a DCI communication, or a MAC-CE communication.

Aspect 49: The method of one or more of Aspects 42-48, where the second component carrier is associated with a target physical uplink control channel (PUCCH) carrier; where the first uplink resource is included in a first target slot on the target PUCCH carrier; and where the second uplink resource is included in a second target slot on the target PUCCH carrier.

Aspect 50: The method of one or more of Aspects 42-50, where the deferred HARQ feedback includes a plurality of repetitions of the deferred HARQ feedback; and where receiving deferred HARQ feedback in the second uplink resource on the second component carrier includes: receiving at least a subset of the plurality of repetitions of the deferred HARQ feedback in the second uplink resource on the second component carrier.

Aspect 51: The method of Aspect 50, further including: receiving, in a third uplink resource on the first component carrier that occurs after the second uplink resource, another subset of the plurality of repetitions of the deferred HARQ feedback.

Aspect 52: The method of Aspect 50 or 51, further including: receiving a plurality of repetitions of a non-deferred HARQ feedback, associated with another downlink communication, in the first uplink resource.

Aspect 53: The method of one or more of Aspects 50-52, where the plurality of repetitions of the deferred HARQ feedback includes a first plurality of repetitions of first deferred HARQ feedback associated with a first downlink communication; and where the method further includes: receiving, in the second uplink resource along with at least a subset of the plurality of repetitions of the deferred HARQ feedback, at least a subset of a second plurality of repetitions of a second deferred HARQ feedback associated with a second downlink communication.

Aspect 54: A method performed by a wireless communication apparatus, including: transmitting a downlink communication on a first component carrier; and receiving deferred HARQ feedback, associated with the downlink communication in a second uplink resource on a second component carrier, that occurs after a first uplink resource on the second component carrier.

Aspect 55: The method of Aspect 54, where the deferred HARQ feedback is deferred from a third uplink resource on the first component carrier, prior to the first uplink resource on the first component carrier and the second uplink resource on the second component carrier, based at least in part on a collision between a downlink resource on the first component carrier and the third uplink resource on the first component carrier.

Aspect 56: The method of Aspect 54 or 55, further including: receiving non-deferred HARQ feedback, associated with another downlink communication, in at least one of: the first uplink resource on the second component carrier, or the second uplink resource, on the first component carrier, along with the deferred HARQ feedback.

Aspect 57: The method of one or more of Aspects 54-56, where the deferred HARQ feedback includes first deferred HARQ feedback associated with a first downlink communication; and where the method further includes: receiving, in the second uplink resource with the first deferred HARQ feedback, second deferred HARQ feedback associated with a second downlink communication.

Aspect 58: The method of Aspect 57, further including: receiving, in the second uplink resource with the first deferred HARQ feedback and the second deferred HARQ feedback, non-deferred HARQ feedback, associated with a third downlink communication.

Aspect 59: The method of one or more of Aspects 54-58, where receiving the deferred HARQ feedback includes: receiving the deferred HARQ feedback in the second uplink resource based at least in part on a quantity of bits associated with the deferred HARQ feedback exceeded a quantity of available bits in the first uplink resource associated with the deferred HARQ feedback.

Aspect 60: The method of one or more of Aspects 54-60, further including: transmitting a configuration, associated with providing the deferred HARQ feedback, in at least one of an RRC communication, a DCI communication, or a MAC-CE communication.

Aspect 61: The method of one or more of Aspects 54-60, where the deferred HARQ feedback includes a plurality of repetitions of the deferred HARQ feedback; and where receiving deferred HARQ feedback in the second uplink resource on the first component carrier includes: receiving at least a subset of the plurality of repetitions of the deferred HARQ feedback in the second uplink resource on the first component carrier.

Aspect 62: The method of Aspect 61, further including: receiving, in a third uplink resource after the first uplink resource, another subset of the plurality of repetitions of the deferred HARQ feedback on the second component carrier that occurs after the first uplink resource.

Aspect 63: The method of Aspect 61 or 62, further including: receiving a plurality of repetitions of a non-deferred HARQ feedback, associated with another downlink communication, in the first uplink resource on the second component carrier.

Aspect 64: The method of one or more of Aspects 54-63, where the plurality of repetitions of the deferred HARQ feedback includes a first plurality of repetitions of first deferred HARQ feedback associated with a first downlink communication; and where the method further includes: receiving, in the second uplink resource on the first component carrier along with at least a subset of the plurality of repetitions of the deferred HARQ feedback, at least a subset of a second plurality of repetitions of a second deferred HARQ feedback associated with a second downlink communication.

Aspect 65: An apparatus for wireless communication at a device, including a processor; memory coupled with the processor; and instructions stored in the memory and executable by the processor to cause the apparatus to perform the method of one or more of Aspects 1-13.

Aspect 66: A device for wireless communication, including a memory and one or more processors coupled to the memory, the one or more processors configured to perform the method of one or more of Aspects 1-13.

Aspect 67: An apparatus for wireless communication, including at least one means for performing the method of one or more of Aspects 1-13.

Aspect 68: A non-transitory computer-readable medium storing code for wireless communication, the code including instructions executable by a processor to perform the method of one or more of Aspects 1-13.

Aspect 69: A non-transitory computer-readable medium storing a set of instructions for wireless communication, the set of instructions including one or more instructions that, when executed by one or more processors of a device, cause the device to perform the method of one or more of Aspects 1-13.

Aspect 70: An apparatus for wireless communication at a device, including a processor; memory coupled with the processor; and instructions stored in the memory and executable by the processor to cause the apparatus to perform the method of one or more of Aspects 14-28.

Aspect 71: A device for wireless communication, including a memory and one or more processors coupled to the memory, the one or more processors configured to perform the method of one or more of Aspects 14-28.

Aspect 72: An apparatus for wireless communication, including at least one means for performing the method of one or more of Aspects 14-28.

Aspect 73: A non-transitory computer-readable medium storing code for wireless communication, the code including instructions executable by a processor to perform the method of one or more of Aspects 14-28.

Aspect 74: A non-transitory computer-readable medium storing a set of instructions for wireless communication, the set of instructions including one or more instructions that, when executed by one or more processors of a device, cause the device to perform the method of one or more of Aspects 14-28.

Aspect 75: An apparatus for wireless communication at a device, including a processor; memory coupled with the processor; and instructions stored in the memory and executable by the processor to cause the apparatus to perform the method of one or more of Aspects 29-41.

Aspect 76: A device for wireless communication, including a memory and one or more processors coupled to the memory, the one or more processors configured to perform the method of one or more of Aspects 29-41.

Aspect 77: An apparatus for wireless communication, including at least one means for performing the method of one or more of Aspects 29-41.

Aspect 78: A non-transitory computer-readable medium storing code for wireless communication, the code including instructions executable by a processor to perform the method of one or more of Aspects 29-41.

Aspect 79: A non-transitory computer-readable medium storing a set of instructions for wireless communication, the set of instructions including one or more instructions that, when executed by one or more processors of a device, cause the device to perform the method of one or more of Aspects 29-41.

Aspect 80: An apparatus for wireless communication at a device, including a processor; memory coupled with the processor; and instructions stored in the memory and executable by the processor to cause the apparatus to perform the method of one or more of Aspects 42-52.

Aspect 81: A device for wireless communication, including a memory and one or more processors coupled to the memory, the one or more processors configured to perform the method of one or more of Aspects 42-53

Aspect 82: An apparatus for wireless communication, including at least one means for performing the method of one or more of Aspects 42-53.

Aspect 83: A non-transitory computer-readable medium storing code for wireless communication, the code including instructions executable by a processor to perform the method of one or more of Aspects 42-53.

Aspect 84: A non-transitory computer-readable medium storing a set of instructions for wireless communication, the set of instructions including one or more instructions that, when executed by one or more processors of a device, cause the device to perform the method of one or more of Aspects 42-53.

Aspect 85: An apparatus for wireless communication at a device, including a processor; memory coupled with the processor; and instructions stored in the memory and executable by the processor to cause the apparatus to perform the method of one or more of Aspects 54-64.

Aspect 86: A device for wireless communication, including a memory and one or more processors coupled to the memory, the one or more processors configured to perform the method of one or more of Aspects 54-64.

Aspect 87: An apparatus for wireless communication, including at least one means for performing the method of one or more of Aspects 54-64.

Aspect 88: A non-transitory computer-readable medium storing code for wireless communication, the code including instructions executable by a processor to perform the method of one or more of Aspects 54-64.

Aspect 89: A non-transitory computer-readable medium storing a set of instructions for wireless communication, the set of instructions including one or more instructions that, when executed by one or more processors of a device, cause the device to perform the method of one or more of Aspects 54-64.

The foregoing disclosure provides illustration and description but is not intended to be exhaustive or to limit the aspects to the precise forms disclosed. Modifications and variations may be made in light of the disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A user equipment (UE) for wireless communication, comprising:
    a processing system that includes one or more processors and one or more code-storing memories coupling with the one or more processors, the processing system configured to cause the UE to:
        receive a downlink communication on a first component carrier;
        perform, associated with a semi-static physical uplink control channel (PUCCH) cell pattern, a carrier switch from the first component carrier to a second component carrier after the downlink communication and prior to a second uplink resource on the second component carrier; and transmit deferred hybrid automatic repeat request (HARQ) feedback associated with the downlink communication in the second uplink resource on the second component carrier that occurs after a first uplink resource.

2. The UE of claim 1, wherein the deferred HARQ feedback is deferred from a third uplink resource on the first component carrier, prior to the first uplink resource and the second uplink resource on the second component carrier, based at least in part on a collision between a downlink resource on the first component carrier and the third uplink resource on the first component carrier.

3. The UE of claim 1, wherein the processing system is further configured to:

transmit non-deferred HARQ feedback, associated with another downlink communication, for transmission in the first uplink resource.

4. The UE of claim 1, wherein the deferred HARQ feedback includes first deferred HARQ feedback associated with a first downlink communication; and wherein the processing system is further configured to:
transmit, in the second uplink resource with the first deferred HARQ feedback, second deferred HARQ feedback associated with a second downlink communication.

5. The UE of claim 4, wherein the processing system is further configured to:

transmit, in the second uplink resource with the first deferred HARQ feedback and the second deferred HARQ feedback, non-deferred HARQ feedback associated with a third downlink communication.

6. The UE of claim 1, wherein the processing system, to transmit the deferred HARQ feedback in the second uplink resource, is configured to:

transmit the deferred HARQ feedback in the second uplink resource based at least in part on a configuration that is received in at least one of:
a radio resource control (RRC) communication,
a downlink control information (DCI) communication, or
a medium access control (MAC) control element (MAC-CE) communication.

7. The UE of claim 1, wherein the second component carrier is associated with a target PUCCH carrier;

wherein the first uplink resource is included in a first target slot on the target PUCCH carrier; and wherein the second uplink resource is included in a second target slot on the target PUCCH carrier.

8. The UE of claim 1, wherein the first uplink resource is on the second component carrier.

9. A network node for wireless communication, comprising:

a processing system that includes one or more processors and one or more code-storing memories coupling with the one or more processors, the processing system configured to cause the network node to:
transmit a downlink communication for transmission on a first component carrier,
wherein a carrier switch, associated with a semi-static physical uplink control channel (PUCCH) cell pattern, from the first component carrier to a second component carrier occurs after the downlink communication and prior to a second uplink resource on the second component carrier; and receive deferred hybrid automatic repeat request (HARQ) feedback associated with the downlink communication, in the second uplink resource on the second component carrier that occurs after a first uplink resource on the second component carrier.

10. The network node of claim 9, wherein the deferred HARQ feedback is deferred from a third uplink resource on the first component carrier, prior to the first uplink resource and the second uplink resource on the second component carrier, based at least in part on a collision between a downlink resource on the first component carrier and the third uplink resource on the first component carrier.

11. The network node of claim 9, wherein the processing system is further configured to:

receive non-deferred HARQ feedback, associated with another downlink communication, in the first uplink resource.

12. The network node of claim 9, wherein the deferred HARQ feedback includes first deferred HARQ feedback associated with a first downlink communication; and wherein the processing system is further configured to:
obtain, in the second uplink resource with the first deferred HARQ feedback, second deferred HARQ feedback associated with a second downlink communication.

13. The network node of claim 12, wherein the processing system is further configured to:

receive, in the second uplink resource with the first deferred HARQ feedback and the second deferred HARQ feedback, non-deferred HARQ feedback associated with a third downlink communication.

14. The network node of claim 9, wherein the processing system, to receive the deferred HARQ feedback, is configured to:

receive the deferred HARQ feedback in the second uplink resource based at least in part on a quantity of bits associated with the deferred HARQ feedback exceeding a quantity of available bits in the first uplink resource associated with the deferred HARQ feedback.

15. The network node of claim 9, wherein the processing system is configured to:

receive a configuration, associated with providing the deferred HARQ feedback, in at least one of:
a radio resource control (RRC) communication,
a downlink control information (DCI) communication, or
a medium access control (MAC) control element (MAC-CE) communication.

16. A method performed by a wireless communication apparatus, comprising:

receiving a downlink communication on a first component carrier;

performing, associated with a semi-static physical uplink control channel (PUCCH) cell pattern, a carrier switch from the first component carrier to a second component carrier after the downlink communication and prior to a second uplink resource on the second component carrier; and transmitting deferred hybrid automatic repeat request (HARQ) feedback associated with the downlink communication, in the second uplink resource on the second component carrier that occurs after a first uplink resource.

17. The method of claim 16, wherein the deferred HARQ feedback is deferred from a third uplink resource on the first component carrier, prior to the first uplink resource and the second uplink resource on the second component carrier, based at least in part on a collision between a downlink resource on the first component carrier and the third uplink resource on the first component carrier.

18. The method of claim 16, further comprising:
transmitting non-deferred HARQ feedback, associated with another downlink communication, in the first uplink resource.

19. The method of claim 16, wherein the deferred HARQ feedback includes first deferred HARQ feedback associated with a first downlink communication; and
wherein the method further comprises:
transmitting, in the second uplink resource with the first deferred HARQ feedback, second deferred HARQ feedback associated with a second downlink communication.

20. The method of claim 19, further comprising:
transmitting, in the second uplink resource with the first deferred HARQ feedback and the second deferred HARQ feedback, non-deferred HARQ feedback associated with a third downlink communication.

21. The method of claim 16, wherein transmitting the deferred HARQ feedback in the second uplink resource comprises:
transmitting the deferred HARQ feedback in the second uplink resource based at least in part on a configuration that is received in at least one of:
a radio resource control (RRC) communication,
a downlink control information (DCI) communication, or
a medium access control (MAC) control element (MAC-CE) communication.

22. The method of claim 16, wherein the second component carrier is associated with a target PUCCH carrier;
wherein the first uplink resource is included in a first target slot on the target PUCCH carrier; and
wherein the second uplink resource is included in a second target slot on the target PUCCH carrier.

23. The method of claim 16, wherein the first uplink resource is on the second component carrier.

24. A method performed by a wireless communication apparatus, comprising:
transmitting a downlink communication on a first component carrier,
wherein a carrier switch, associated with a semi-static physical uplink control channel (PUCCH) cell pattern, from the first component carrier to a second component carrier occurs after the downlink communication and prior to a second uplink resource on the second component carrier; and
receiving deferred hybrid automatic repeat request (HARQ) feedback associated with the downlink communication, in the second uplink resource on the second component carrier that occurs after a first uplink resource on the second component carrier.

25. The method of claim 24, wherein the deferred HARQ feedback is deferred from a third uplink resource on the first component carrier, prior to the first uplink resource and the second uplink resource on the second component carrier, based at least in part on a collision between a downlink resource on the first component carrier and the third uplink resource on the first component carrier.

26. The method of claim 24, further comprising:
receiving non-deferred HARQ feedback, associated with another downlink communication, in the first uplink resource.

27. The method of claim 24, wherein the deferred HARQ feedback includes first deferred HARQ feedback associated with a first downlink communication; and
wherein the method further comprises:
receiving, in the second uplink resource with the first deferred HARQ feedback, second deferred HARQ feedback associated with a second downlink communication.

28. The method of claim 27, further comprising:
receiving, in the second uplink resource with the first deferred HARQ feedback and the second deferred HARQ feedback, non-deferred HARQ feedback associated with a third downlink communication.

29. The method of claim 24, wherein receiving the deferred HARQ feedback comprises:
receiving the deferred HARQ feedback in the second uplink resource based at least in part on a quantity of bits associated with the deferred HARQ feedback exceeding a quantity of available bits in the first uplink resource associated with the deferred HARQ feedback.

30. The method of claim 24, further comprising:
transmitting a configuration, associated with providing the deferred HARQ feedback, in at least one of:
a radio resource control (RRC) communication,
a downlink control information (DCI) communication, or
a medium access control (MAC) control element (MAC-CE) communication.

* * * * *